US012566972B2

(12) United States Patent
Zhu et al.

(10) Patent No.: US 12,566,972 B2
(45) Date of Patent: Mar. 3, 2026

(54) DATA DENOISING METHOD AND RELATED DEVICE

(71) Applicants: HUAWEI TECHNOLOGIES CO., LTD., Shenzhen (CN); TSINGHUA UNIVERSITY, Beijing (CN)

(72) Inventors: Jun Zhu, Beijing (CN); Fan Bao, Shenzhen (CN); Chongxuan Li, Beijing (CN); Jiacheng Sun, Shenzhen (CN)

(73) Assignees: Huawei Technologies Co., Ltd., Shenzhen (CN); TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 18/965,817

(22) Filed: Dec. 2, 2024

(65) Prior Publication Data

US 2025/0094818 A1     Mar. 20, 2025

Related U.S. Application Data

(63) Continuation of application No. PCT/CN2023/096793, filed on May 29, 2023.

(30) Foreign Application Priority Data

Jun. 2, 2022    (CN) .......................... 202210623507.7

(51) Int. Cl.
*G06N 3/094* (2023.01)
*G06F 18/2135* (2023.01)
(52) U.S. Cl.
CPC ......... *G06N 3/094* (2023.01); *G06F 18/2135* (2023.01)
(58) Field of Classification Search
CPC ........................... G06N 3/094; G06F 18/2135
See application file for complete search history.

(56) References Cited

U.S. PATENT DOCUMENTS

2010/0278447 A1* 11/2010 Seroussi ................... G06T 5/70
                                                                 382/260
2011/0268328 A1* 11/2011 Bar-Aviv .................. G06T 5/70
                                                                 382/128

(Continued)

FOREIGN PATENT DOCUMENTS

CN         108416755 A      8/2018
CN         108897045 A     11/2018
CN         115081616 A      9/2022

OTHER PUBLICATIONS

Chen, "Wavegrad: Estimating Gradients for Waveform Generation," arXiv:2009.00713v2 [eess.AS] Total 15 pages (Oct. 2020).

(Continued)

*Primary Examiner* — Qun Shen
(74) *Attorney, Agent, or Firm* — Leydig, Voit & Mayer, Ltd.

(57)          ABSTRACT

A data denoising method and a related device are provided. According to the method, an artificial intelligence technology may be used to perform denoising on data, and any target denoising operation in at least one denoising operation performed on noisy data includes: generating, based on first prediction information and second prediction information, distribution information corresponding to the target denoising operation, where the first prediction information indicates predicted noise between second noisy data and clean data, the second prediction information indicates a square of the predicted noise between the second noisy data and the clean data or indicates a square of a predicted distance between the first prediction information and actual noise, and the actual noise includes actual noise between the second noisy data and the clean data; and sampling denoised data in distribution space to which the distribution information points.

20 Claims, 19 Drawing Sheets

(56) References Cited

U.S. PATENT DOCUMENTS

| | | | |
|---|---|---|---|
| 2018/0343448 A1* | 11/2018 | Possos | H04N 19/176 |
| 2020/0225673 A1* | 7/2020 | Ebrahimi Afrouzi | A47L 11/4011 |
| 2021/0272240 A1* | 9/2021 | Litwiller | A61B 6/5258 |
| 2022/0384055 A1* | 12/2022 | Gopalakrishnan | G06N 20/00 |
| 2023/0095092 A1* | 3/2023 | Xiao | G06T 5/70 382/254 |
| 2023/0285774 A1* | 9/2023 | Chen | G16H 20/40 |
| 2024/0046946 A1* | 2/2024 | Yang | G10L 21/0208 |
| 2024/0177012 A1* | 5/2024 | Sultan | G16B 15/30 |

OTHER PUBLICATIONS

Bao et al., "Analytic-DPM: An Analytic Estimate of the Optimal Reverse Variance in Diffusion Probabilistic Models," arXiv:2201. 06503v3 [cs.LG], Published as a conference paper at ICLR 2022, Total 39 pages (May 2022).

Nichol et al., "Glide: Towards Photorealistic Image Generation and Editing with Text-Guided Diffusion Models," arXiv:2112.10741v3 [cs.CV], Total 20 pages (Mar. 2022).

Popov et al., "Diffusion-Based Voice Conversion With Fast Maximum Likelihood Sampling Scheme," arXiv:2109.13821v1 [cs.SD], Total 23 pages (Sep. 2021).

Popov et al., "Grad-TTS: A Diffusion Probabilistic Model for Text-to-Speech," arXiv:2105.06337v2 [cs.LG], Total 13 pages (Aug. 2021).

Dhariwal et al., "Diffusion Models Beat GANs on Image Synthesis," arXiv:2105.05233v4 [cs.LG], Total 44 pages (Jun. 2021).

Nichol et al., "Improved Denoising Diffusion Probabilistic Models," arXiv:2102.09672v1 [cs.LG], Total 17 pages (Feb. 2021).

Song et al., "Denoising Diffusion Implicit Models," arXiv:2010. 02502v2 [cs.LG], Published as a conference paper at ICLR 2021, Total 22 pages (Nov. 2021).

Ho et al., "Denoising Diffusion Probabilistic Models," arXiv:2006. 11239v2 [cs.LG], Total 25 pages (Dec. 2020).

* cited by examiner

Text description: A boy with a crew cut is on public transportation, wearing Bluetooth earphones and playing on a mobile phone Image that meets a constraint of the text description

200

Database 220

Training device 210

Execution device 230

Client device 250

Second model/ rule 202

First model/ rule 201

Computing module 231

Data storage system 240

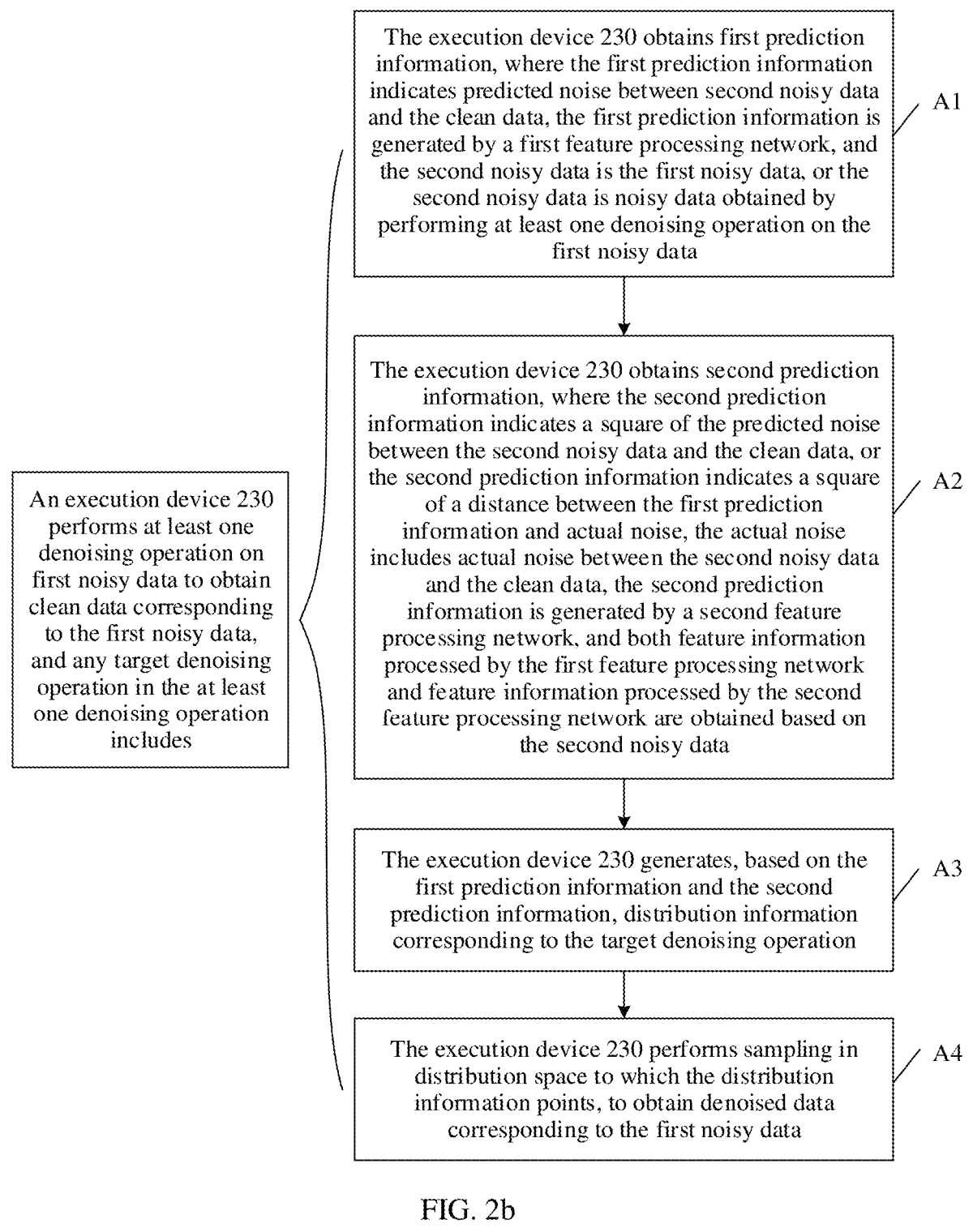

The execution device 230 obtains first prediction information, where the first prediction information indicates predicted noise between second noisy data and the clean data, the first prediction information is generated by a first feature processing network, and the second noisy data is the first noisy data, or the second noisy data is noisy data obtained by performing at least one denoising operation on the first noisy data    A1

An execution device 230 performs at least one denoising operation on first noisy data to obtain clean data corresponding to the first noisy data, and any target denoising operation in the at least one denoising operation includes The execution device 230 obtains second prediction information, where the second prediction information indicates a square of the predicted noise between the second noisy data and the clean data, or the second prediction information indicates a square of a distance between the first prediction information and actual noise, the actual noise includes actual noise between the second noisy data and the clean data, the second prediction information is generated by a second feature processing network, and both feature information processed by the first feature processing network and feature information processed by the second feature processing network are obtained based on the second noisy data    A2

The execution device 230 generates, based on the first prediction information and the second prediction information, distribution information corresponding to the target denoising operation    A3

The execution device 230 performs sampling in distribution space to which the distribution information points, to obtain denoised data corresponding to the first noisy data    A4

FIG. 2b

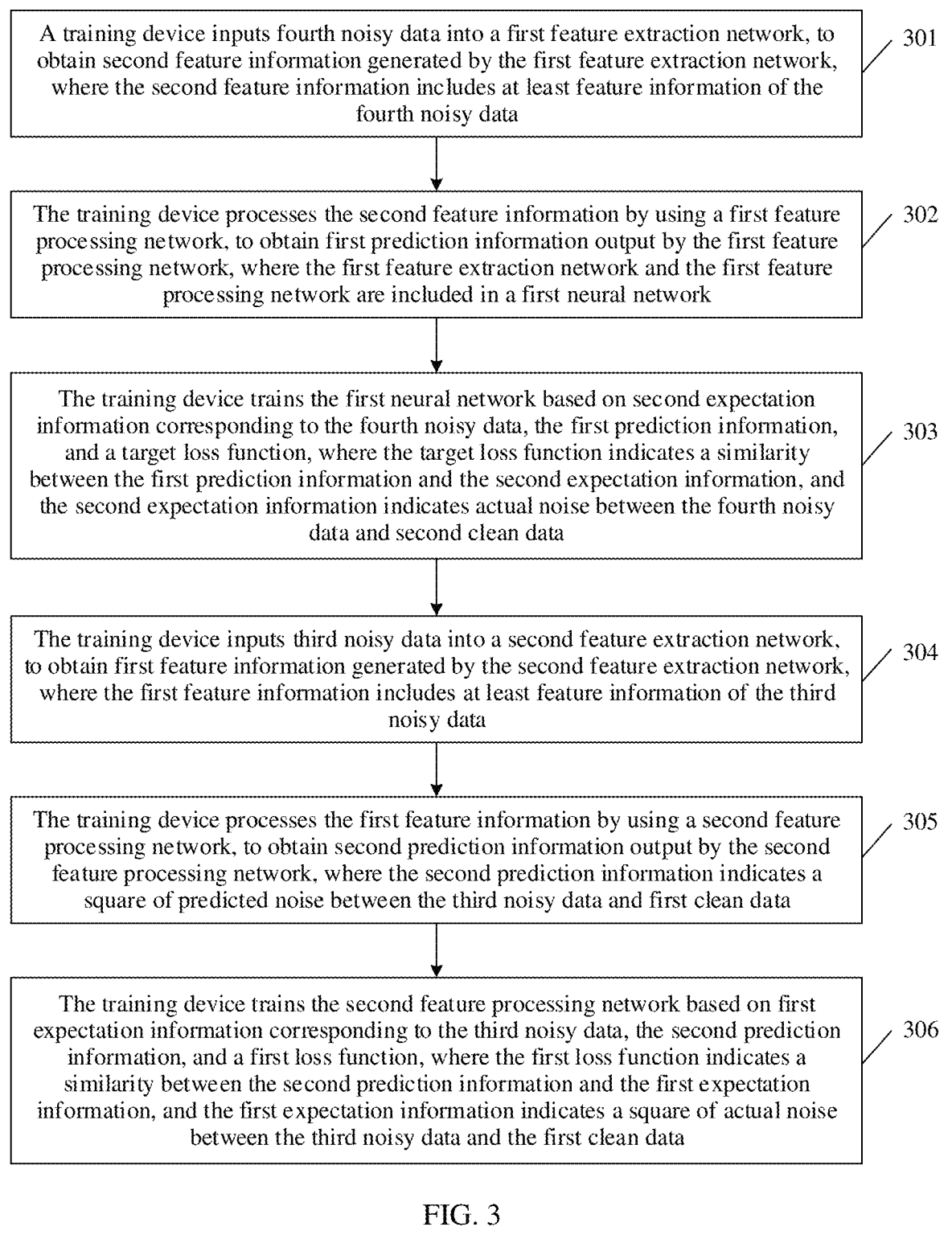

A training device inputs fourth noisy data into a first feature extraction network, to obtain second feature information generated by the first feature extraction network, where the second feature information includes at least feature information of the fourth noisy data                                         301

The training device processes the second feature information by using a first feature processing network, to obtain first prediction information output by the first feature processing network, where the first feature extraction network and the first feature processing network are included in a first neural network                                         302

The training device trains the first neural network based on second expectation information corresponding to the fourth noisy data, the first prediction information, and a target loss function, where the target loss function indicates a similarity between the first prediction information and the second expectation information, and the second expectation information indicates actual noise between the fourth noisy data and second clean data                                         303

The training device inputs third noisy data into a second feature extraction network, to obtain first feature information generated by the second feature extraction network, where the first feature information includes at least feature information of the third noisy data                                         304

The training device processes the first feature information by using a second feature processing network, to obtain second prediction information output by the second feature processing network, where the second prediction information indicates a square of predicted noise between the third noisy data and first clean data                                         305

The training device trains the second feature processing network based on first expectation information corresponding to the third noisy data, the second prediction information, and a first loss function, where the first loss function indicates a similarity between the second prediction information and the first expectation information, and the first expectation information indicates a square of actual noise between the third noisy data and the first clean data                                         306

FIG. 3

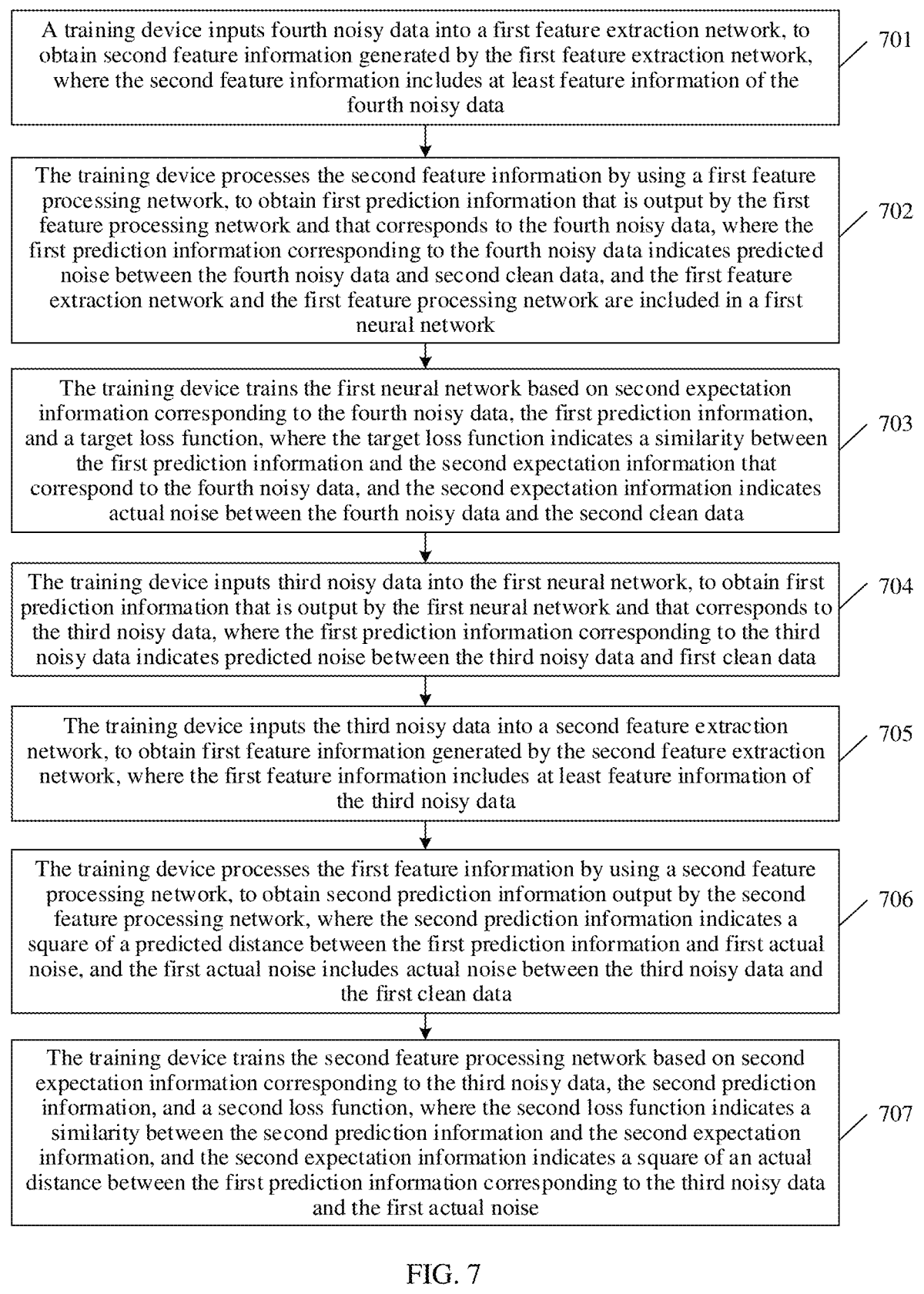

A training device inputs fourth noisy data into a first feature extraction network, to obtain second feature information generated by the first feature extraction network, where the second feature information includes at least feature information of the fourth noisy data    701

The training device processes the second feature information by using a first feature processing network, to obtain first prediction information that is output by the first feature processing network and that corresponds to the fourth noisy data, where the first prediction information corresponding to the fourth noisy data indicates predicted noise between the fourth noisy data and second clean data, and the first feature extraction network and the first feature processing network are included in a first neural network    702

The training device trains the first neural network based on second expectation information corresponding to the fourth noisy data, the first prediction information, and a target loss function, where the target loss function indicates a similarity between the first prediction information and the second expectation information that correspond to the fourth noisy data, and the second expectation information indicates actual noise between the fourth noisy data and the second clean data    703

The training device inputs third noisy data into the first neural network, to obtain first prediction information that is output by the first neural network and that corresponds to the third noisy data, where the first prediction information corresponding to the third noisy data indicates predicted noise between the third noisy data and first clean data    704

The training device inputs the third noisy data into a second feature extraction network, to obtain first feature information generated by the second feature extraction network, where the first feature information includes at least feature information of the third noisy data    705

The training device processes the first feature information by using a second feature processing network, to obtain second prediction information output by the second feature processing network, where the second prediction information indicates a square of a predicted distance between the first prediction information and first actual noise, and the first actual noise includes actual noise between the third noisy data and the first clean data    706

The training device trains the second feature processing network based on second expectation information corresponding to the third noisy data, the second prediction information, and a second loss function, where the second loss function indicates a similarity between the second prediction information and the second expectation information, and the second expectation information indicates a square of an actual distance between the first prediction information corresponding to the third noisy data and the first actual noise    707

FIG. 7

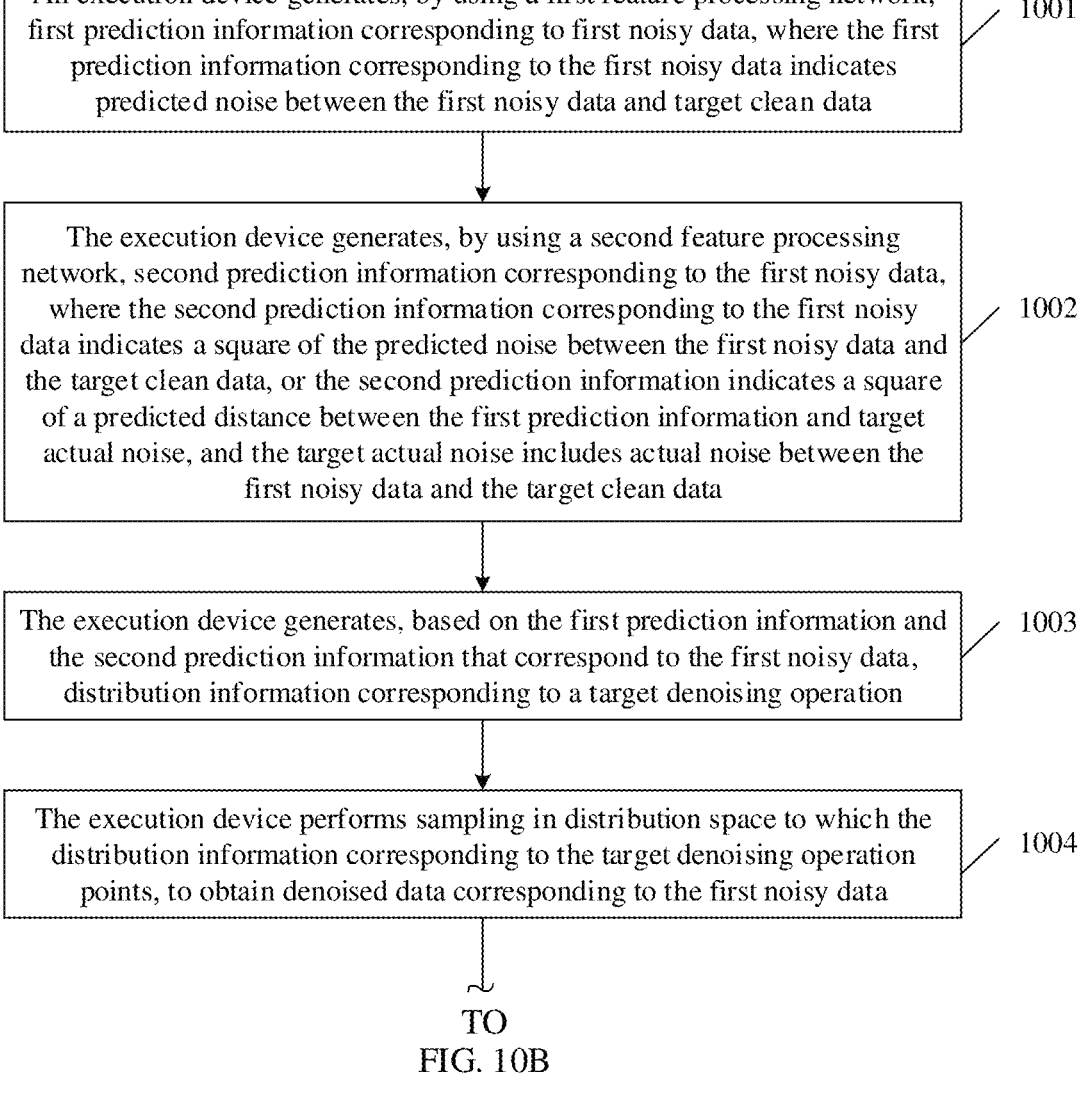

An execution device generates, by using a first feature processing network, first prediction information corresponding to first noisy data, where the first prediction information corresponding to the first noisy data indicates predicted noise between the first noisy data and target clean data

1001

The execution device generates, by using a second feature processing network, second prediction information corresponding to the first noisy data, where the second prediction information corresponding to the first noisy data indicates a square of the predicted noise between the first noisy data and the target clean data, or the second prediction information indicates a square of a predicted distance between the first prediction information and target actual noise, and the target actual noise includes actual noise between the first noisy data and the target clean data

1002

The execution device generates, based on the first prediction information and the second prediction information that correspond to the first noisy data, distribution information corresponding to a target denoising operation

1003

The execution device performs sampling in distribution space to which the distribution information corresponding to the target denoising operation points, to obtain denoised data corresponding to the first noisy data

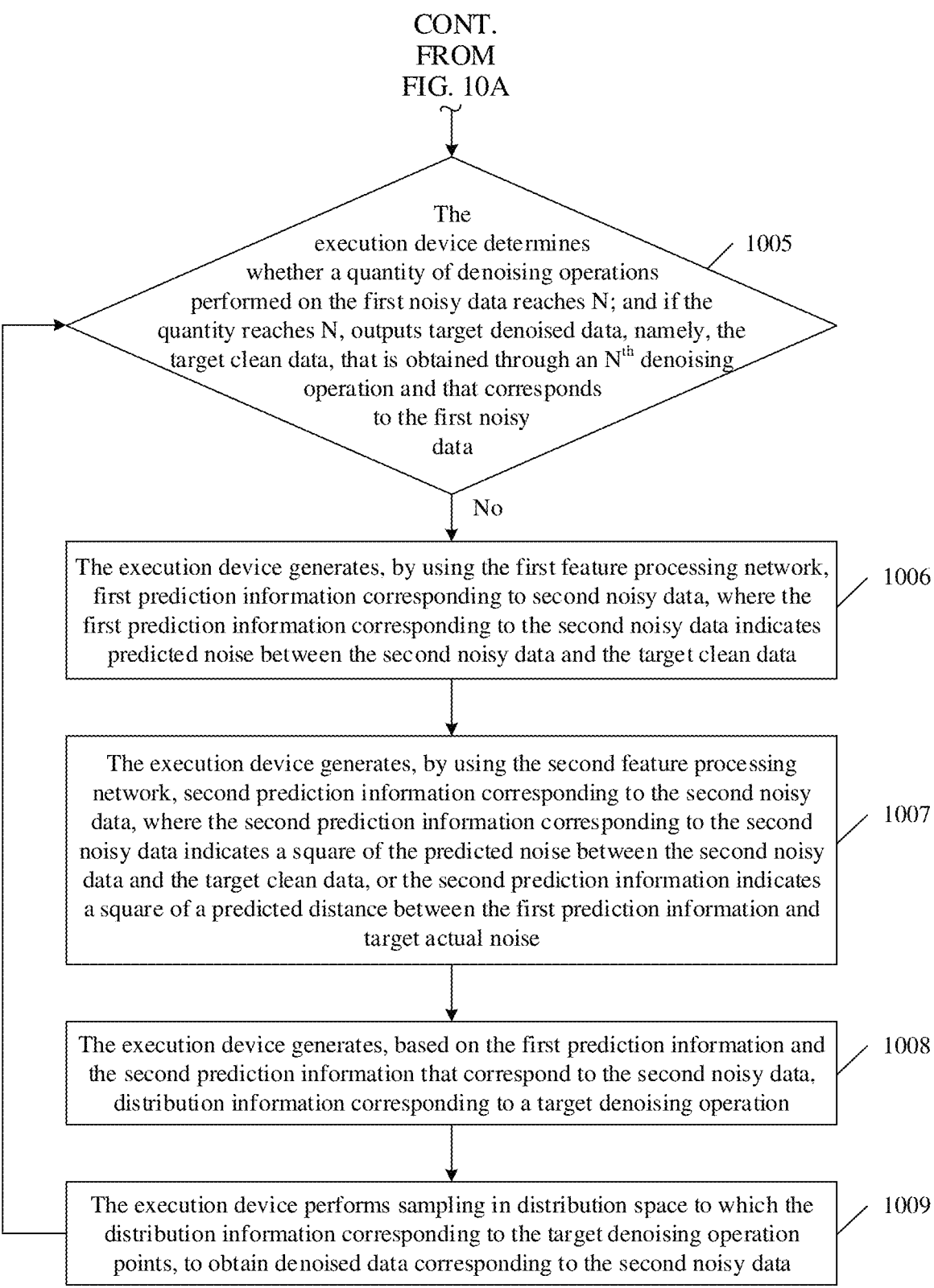

CONT.
FROM
FIG. 10A

The execution device determines whether a quantity of denoising operations performed on the first noisy data reaches N; and if the quantity reaches N, outputs target denoised data, namely, the target clean data, that is obtained through an $N^{th}$ denoising operation and that corresponds to the first noisy data — 1005

No

The execution device generates, by using the first feature processing network, first prediction information corresponding to second noisy data, where the first prediction information corresponding to the second noisy data indicates predicted noise between the second noisy data and the target clean data — 1006

The execution device generates, by using the second feature processing network, second prediction information corresponding to the second noisy data, where the second prediction information corresponding to the second noisy data indicates a square of the predicted noise between the second noisy data and the target clean data, or the second prediction information indicates a square of a predicted distance between the first prediction information and target actual noise — 1007

The execution device generates, based on the first prediction information and the second prediction information that correspond to the second noisy data, distribution information corresponding to a target denoising operation — 1008

The execution device performs sampling in distribution space to which the distribution information corresponding to the target denoising operation points, to obtain denoised data corresponding to the second noisy data — 1009

FIG. 10B

Note: A total of N denoising operations are performed

Dataset
CIFAR10

 

Clean data obtained by performing
1000 denoising operations by
using an original diffusion
probabilistic model Clean data obtained by performing
17 denoising operations according
to a method in embodiments of this
application Dataset
ImageNet

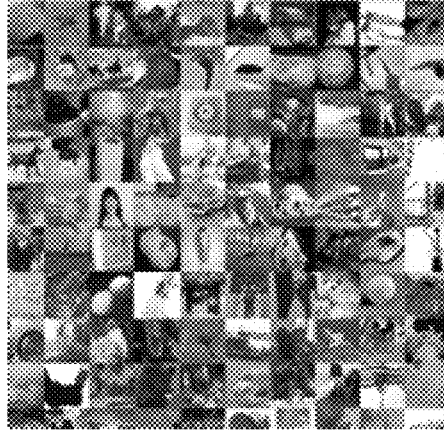 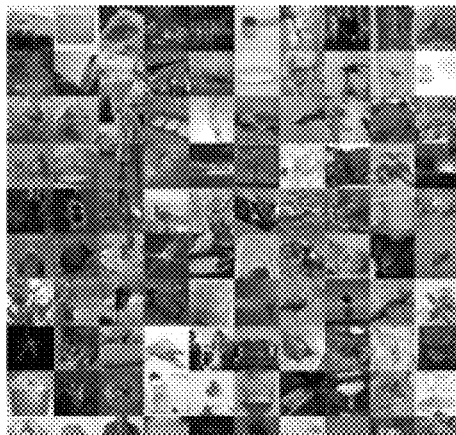

Clean data obtained by performing
1000 denoising operations by
using the original diffusion
probabilistic model Clean data obtained by performing
22 denoising operations according
to the method in embodiments of
this application

DATA DENOISING METHOD AND RELATED DEVICE

CROSS-REFERENCE TO RELATED APPLICATIONS

This application is continuation of International Application No. PCT/CN2023/096793, filed on May 29, 2023, which claims priority to Chinese Patent Application No. 202210623507.7, filed on Jun. 2, 2022. The disclosures of the aforementioned applications are hereby incorporated by reference in their entireties.

TECHNICAL FIELD

This application relates to the artificial intelligence field, and in particular, to a data denoising method and a related device.

BACKGROUND

A diffusion probabilistic model (DPM) has achieved great effect in many generation tasks, such as high-resolution image generation, text-to-image conversion, text-to-speech conversion, and speech generation. All the foregoing processes can be implemented by performing denoising operations on noisy data by using the diffusion probabilistic model.

Currently, in a process of performing denoising by using the diffusion probabilistic model, noisy data is input into the diffusion probabilistic model, and an average value corresponding to a current denoising operation is determined based on data output by the diffusion probabilistic model. The noisy data is input into a target neural network, to obtain a covariance that is output by the target neural network and that corresponds to the current denoising operation. Sampling is performed in distribution space to which the average value and the covariance that correspond to the current denoising operation point, to obtain denoised data corresponding to the noisy data.

In a process of training the diffusion probabilistic model and the neural network, Gaussian noise is first added to clean data step by step. After M steps of noise addition operations are performed, the clean data is transformed into the noisy data. Usually, a value of s ranges from hundreds to thousands. To improve efficiency of the denoising process, a quantity of performed denoising operations may be less than a quantity of performed noise addition operations. However, because the target neural network outputs the covariance corresponding to the denoising operation, a quantity of times of performing denoising by the target neural network in an inference phase needs to be consistent with a quantity of times of performing denoising in a training phase. In other words, flexibility of the target neural network obtained through training is poor. In an example, if the target neural network learns, in the training phase, to gradually transform the noisy data into the clean data after performing 10 denoising operations, 10 denoising operations also need to be performed in a denoising phase.

In addition, because good denoising effect may not be achieved by performing 10 denoising operations, if the noisy data needs to be gradually transformed into the clean data after 20 denoising operations are performed, a new target neural network needs to be retrained; consequently computational resource overheads are huge.

SUMMARY

Embodiments of this application provide a data denoising method and a related device. Distribution information corresponding to a denoising operation is generated based on first prediction information and second prediction information. Because neither a first feature processing network nor a second feature processing network directly learns of the distribution information corresponding to the denoising operation, a quantity of denoising operations performed on first noisy data is not constrained by a training phase. When the quantity of denoising operations needs to be adjusted, the first feature processing network and the second feature processing network do not need to be retrained. According to the denoising solution provided in embodiments of this application, computer resource overheads caused by repeated training of a neural network are avoided, and flexibility of an inference phase is improved.

To resolve the foregoing technical problem, embodiments of this application provide the following technical solutions.

According to a first aspect, an embodiment of this application provides a data denoising method. An artificial intelligence technology may be used to perform denoising on data, the method is used by an execution device to perform at least one denoising operation on first noisy data to obtain clean data corresponding to the first noisy data, and any target denoising operation in the at least one denoising operation includes:

The execution device obtains first prediction information. The first prediction information indicates predicted noise between second noisy data and the clean data, and the first prediction information is generated by a first feature processing network. If the target denoising operation is a $1^{st}$ denoising operation, the second noisy data is the first noisy data. If the at least one denoising operation is at least two denoising operations, and the target denoising operation is not a $1^{st}$ denoising operation, the second noisy data is noisy data obtained by performing at least one denoising operation on the first noisy data.

The execution device obtains second prediction information. The second prediction information indicates a square of the predicted noise between the second noisy data and the clean data, and "the square of the predicted noise between the second noisy data and the clean data" represents a square of each value in the predicted noise between the second noisy data and the clean data. Alternatively, the second prediction information indicates a square of a predicted distance between the first prediction information and actual noise, and the actual noise includes actual noise between the second noisy data and the clean data. The second prediction information is generated by a second feature processing network, and both feature information processed by the first feature processing network and feature information processed by the second feature processing network are obtained based on the second noisy data.

The execution device generates, based on the first prediction information and the second prediction information, distribution information corresponding to the target denoising operation; and performs a sampling operation in distribution space to which the distribution information points, to obtain denoised data corresponding to the second noisy data, in other words, obtain denoised data after the target denoising operation is performed.

In this implementation, in a process of performing a denoising operation, the first feature processing network is used to generate first prediction information, to be specific, predicted noise between noisy data and the clean data; the second feature processing network is used to generate second prediction information, where the second prediction information indicates a square of the predicted noise between the noisy data and the clean data or indicates a square of a distance between the first prediction information and actual noise; and further distribution information corresponding to the denoising operation is generated based on the first prediction information and the second prediction information, and sampling is performed in distribution space to which the distribution information points to obtain denoised data corresponding to the noisy data. In this way, one denoising operation in M steps of denoising operations is completed. Because the first feature processing network and the second feature processing network learn of data between the noisy data and the clean data, in other words, neither the first feature processing network nor the second feature processing network directly learns of the distribution information corresponding to the denoising operation, a quantity of denoising operations performed on the first noisy data is not constrained by a training phase. When the quantity of denoising operations needs to be adjusted, the first feature processing network and the second feature processing network do not need to be retrained. According to the denoising solution provided in this embodiment of this application, computer resource overheads caused by repeated training of a neural network are avoided, and flexibility of an inference phase is improved.

In a possible implementation of the first aspect, the at least one denoising operation is N denoising operations, and N is an integer greater than or equal to 1. In the training phase, pure noise is obtained by performing M steps of noise addition processes on the clean data. Therefore, correspondingly, the clean data can be obtained by performing the M steps of denoising operations on the pure noise, and an ideal state is that a process of obtaining denoised data by each denoising operation is a complete inverse process of a corresponding noise addition operation. To improve efficiency of the inference phase, in this solution, only the N denoising operations are performed in the inference phase, and a value of N is far less than s. In this case, an objective of each of the N denoising operations is to obtain, based on noisy data corresponding to an $n^{th}$ step of noise addition operation in M steps of noise addition operations, noisy data corresponding to an $s^{th}$ step of noise addition operation in the M steps of noise addition denoising operations. Both n and s are positive integers, a value of n is greater than a value of s, and a difference between n and s is greater than or equal to 2. In other words, each of the N denoising operations includes achieving denoising effect of a plurality of denoising operations in the M steps of denoising operations in the ideal state. Both the feature information processed by the first feature processing network and the feature information processed by the second feature processing network are obtained based on the second noisy data and a value of n corresponding to the second noisy data.

If the first noisy data is the pure noise, the value of n may be divisible by M. If the first noisy data is not the pure noise, the execution device may estimate, based on the first noisy data, values of n and N corresponding to the first noisy data. If more noise is carried in the first noisy data, a value of n is closer to M, and the value of N is larger. If less noise is carried in the first noisy data, the values of n and N are smaller.

In a possible implementation of the first aspect, the first feature processing network and the second feature processing network are used to process same feature information. Specifically, in a case, the first feature processing network and the second feature processing network use a same feature extraction network. In another case, a first feature extraction network included in a first neural network and a second feature extraction network included in a second neural network may be a same neural network.

In this implementation, the first feature processing network and the second feature processing network process the same feature information, in other words, the first feature processing network and the second feature processing network correspond to the same feature extraction network, in other words, only one feature extraction network needs to be trained in the training phase. This helps improve efficiency of the training phase.

In a possible implementation of the first aspect, the at least one denoising operation is N denoising operations, N is an integer greater than or equal to 1, N is a hyperparameter if the first noisy data is pure noise, the feature information processed by the first feature processing network includes feature information of the second noisy data and feature information of constraint information, and the clean data meets a constraint of the constraint information. In this implementation, denoising operations may be continuously performed on the pure noise (that is, no information in the clean data is carried) based on the constraint information, to obtain the clean data that meets the constraint information. In other words, the clean data that meets the constraint information can be generated from nothing by using the first neural network and the second neural network. This expands a specific channel for obtaining the clean data.

In a possible implementation of the first aspect, if the distribution space corresponding to the denoising operation meets a Gaussian distribution or a Gamma distribution, that the execution device generates, based on the first prediction information and the second prediction information, distribution information corresponding to the target denoising operation includes: The execution device generates, based on the first prediction information, an average value corresponding to the target denoising operation; and generates, based on the second prediction information, a covariance corresponding to the target denoising operation.

In this implementation, implementation details of generating distribution information of each denoising operation based on first prediction information and second prediction information are further disclosed, and implementability of this solution is improved.

In a possible implementation of the first aspect, that the execution device generates, based on the first prediction information and the second prediction information, distribution information corresponding to the target denoising operation includes: The execution device may determine values of n and s corresponding to an $H^{th}$ denoising operation (namely, the target denoising operation) in the N denoising operations, and further generates, based on the first prediction information corresponding to the second noisy data, a value of n, and a value of s, an average value corresponding to the $H^{th}$ denoising operation (namely, the target denoising operation) in the N denoising operations, where a value of H is greater than or equal to 1. Correspondingly, the execution device may generate, based on the second prediction information corresponding to the second noisy data, the value of n, and the value of s, a covariance corresponding to the $H^{th}$ denoising operation (namely, the target denoising operation) in the N denoising operations.

In a possible implementation of the first aspect, the distribution space to which the distribution information points follows a Gaussian distribution or a Gamma distribution. In this implementation, denoised data may be sampled in the distribution space that follows the Gaussian distribution or the Gamma distribution. In other words, regardless of whether noise carried in the noisy data is Gaussian noise or Gamma noise, the data denoising method provided in this embodiment of this application may be used to perform denoising. This expands an application scenario of this solution, and improves implementation flexibility of this solution.

In a possible implementation of the first aspect, the clean data may be specifically used to represent any one of the following types of data: image data, sound data, text data, another type of data, or the like. Further, the clean data, the first noisy data, and the second noisy data have a same data size. In other words, the clean data, the noisy data, and the second noisy data are all specifically H-dimensional tensors, and all of H dimensions have a same length.

According to a second aspect, an embodiment of this application provides a neural network training method. An artificial intelligence technology may be used to perform denoising on data, and the method includes: A training device inputs third noisy data into a feature extraction network, to obtain first feature information generated by the feature extraction network, where the first feature information includes at least feature information of the third noisy data. The training device processes the first feature information by using a second feature processing network, to obtain second prediction information output by the second feature processing network, where the second prediction information indicates a square of predicted noise between the third noisy data and first clean data, and the third noisy data is obtained by performing a plurality of noise addition operations on the first clean data. The training device trains the second feature processing network based on first expectation information corresponding to the third noisy data, the second prediction information, and a first loss function until a convergence condition is met, where the first loss function indicates a similarity between the second prediction information and the first expectation information, and the first expectation information indicates a square of actual noise between the third noisy data and the first clean data.

In the second aspect of this application, the training device may be further configured to perform the steps performed by the execution device in the first aspect and the possible implementations of the first aspect. For specific implementations of the steps, meanings of nouns, and beneficial effect brought in the possible implementations of the second aspect, refer to the first aspect. Details are not described herein again.

According to a third aspect, an embodiment of this application provides a neural network training method. An artificial intelligence technology may be used to perform denoising on data, and the method includes: A training device inputs third noisy data into a feature extraction network, to obtain first feature information generated by the feature extraction network, where the first feature information includes at least feature information of the third noisy data.

The training device processes the first feature information by using a second feature processing network, to obtain second prediction information output by the second feature processing network, where the third noisy data is obtained by performing a plurality of noise addition operations on first clean data, the second prediction information indicates a square of a predicted distance between first prediction information and actual noise, the first prediction information includes predicted noise that is generated by a first neural network and that is between the third noisy data and the first clean data, the first neural network is used to generate the first prediction information based on the input third noisy data, and the actual noise includes actual noise between the third noisy data and the first clean data.

The training device trains the second feature processing network based on second expectation information corresponding to the third noisy data, the second prediction information, and a second loss function until a convergence condition is met, where the second loss function indicates a similarity between the second prediction information and the second expectation information, and the second expectation information indicates a square of an actual distance between the first prediction information and the actual noise.

In the third aspect of this application, the training device may be further configured to perform the steps performed by the execution device in the first aspect and the possible implementations of the first aspect. For specific implementations of the steps, meanings of nouns, and beneficial effect brought in the possible implementations of the third aspect, refer to the first aspect. Details are not described herein again.

According to a fourth aspect, an embodiment of this application provides a data denoising apparatus. An artificial intelligence technology may be used to perform denoising on data, the data denoising apparatus is configured to perform at least one denoising operation on first noisy data to obtain clean data corresponding to the first noisy data, and the denoising apparatus includes: an obtaining module, configured to obtain first prediction information, where the first prediction information indicates predicted noise between second noisy data and the clean data, the first prediction information is generated by a first feature processing network, and the second noisy data is the first noisy data, or the second noisy data is noisy data obtained by performing at least one denoising operation on the first noisy data, where the obtaining module is further configured to obtain second prediction information, where the second prediction information indicates a square of the predicted noise between the second noisy data and the clean data, or the second prediction information indicates a square of a predicted distance between the first prediction information and actual noise, the actual noise includes actual noise between the second noisy data and the clean data, the second prediction information is generated by a second feature processing network, and both feature information processed by the first feature processing network and feature information processed by the second feature processing network are obtained based on the second noisy data;

a generation module, configured to generate, based on the first prediction information and the second prediction information, distribution information corresponding to a target denoising operation, where the target denoising operation is any one of the at least one denoising operation; and a sampling module, configured to perform sampling in distribution space to which the distribution information points, to obtain denoised data corresponding to the second noisy data.

In the fourth aspect of this application, the data denoising apparatus may be further configured to perform the steps performed by the execution device in the first aspect and the possible implementations of the first aspect. For specific implementations of the steps, meanings of nouns, and beneficial effect brought in the possible implementations of the fourth aspect, refer to the first aspect. Details are not described herein again.

According to a fifth aspect, an embodiment of this application provides a neural network training apparatus. An artificial intelligence technology may be used to perform denoising on data, and the neural network training apparatus includes: a feature extraction module, configured to input third noisy data into a feature extraction network, to obtain first feature information generated by the feature extraction network, where the first feature information includes at least feature information of the third noisy data; a feature processing module, configured to process the first feature information by using a second feature processing network, to obtain second prediction information output by the second feature processing network, where the second prediction information indicates a square of predicted noise between the third noisy data and first clean data, and the third noisy data is obtained by performing a plurality of noise addition operations on the first clean data; and a training module, configured to train the second feature processing network based on first expectation information corresponding to the third noisy data, the second prediction information, and a first loss function until a convergence condition is met, where the first loss function indicates a similarity between the second prediction information and the first expectation information, and the first expectation information indicates a square of actual noise between the third noisy data and the first clean data.

In the fifth aspect of this application, the neural network training apparatus may be further configured to perform the steps performed by the training device in the second aspect and the possible implementations of the second aspect. For specific implementations of the steps, meanings of nouns, and beneficial effect brought in the possible implementations of the fifth aspect, refer to the second aspect. Details are not described herein again.

According to a sixth aspect, an embodiment of this application provides a neural network training apparatus. An artificial intelligence technology may be used to perform denoising on data, and the neural network training apparatus includes: a feature extraction module, configured to input third noisy data into a feature extraction network, to obtain first feature information generated by the feature extraction network, where the first feature information includes at least feature information of the third noisy data; a feature processing module, configured to process the first feature information by using a third feature processing network, to obtain third prediction information output by the third feature processing network, where the third prediction information indicates a square of predicted noise between the third noisy data and first clean data, and the third noisy data is obtained by performing a plurality of noise addition operations on the first clean data; and a training module, configured to train the third feature processing network based on first expectation information corresponding to the third noisy data, the third prediction information, and a first loss function until a convergence condition is met, where the first loss function indicates a similarity between the third prediction information and the first expectation information, and the first expectation information indicates a square of actual noise between the third noisy data and the first clean data.

In the sixth aspect of this application, the neural network training apparatus may be further configured to perform the steps performed by the execution device in the third aspect and the possible implementations of the third aspect. For specific implementations of the steps, meanings of nouns, and beneficial effect brought in the possible implementations of the sixth aspect, refer to the third aspect. Details are not described herein again.

According to a seventh aspect, an embodiment of this application provides a computer program product. The computer program product includes a program. When the program is run on a computer, the computer is enabled to perform the method according to the first aspect, the second aspect, or the third aspect.

According to an eighth aspect, an embodiment of this application provides a computer-readable storage medium. The computer-readable storage medium stores a computer program. When the computer program is run on a computer, the computer is enabled to perform the method according to the first aspect, the second aspect, or the third aspect.

According to a ninth aspect, an embodiment of this application provides an execution device. The execution device includes a processor and a memory, and the processor is coupled to the memory. The memory is configured to store a program. The processor is configured to execute the program in the memory, to enable the execution device to perform the data denoising method in the first aspect.

According to a tenth aspect, an embodiment of this application provides a training device. The training device includes a processor and a memory, and the processor is coupled to the memory. The memory is configured to store a program. The processor is configured to execute the program in the memory, to enable the training device to perform the neural network training method according to the second aspect or the third aspect.

According to an eleventh aspect, this application provides a chip system. The chip system includes a processor and is configured to support a terminal device or a communication device in implementing functions in the foregoing aspects, for example, sending or processing of data and/or information in the foregoing methods. In a possible design, the chip system further includes a memory. The memory is configured to store program instructions and data that are necessary for the terminal device or the communication device. The chip system may include a chip, or may include a chip and another discrete component.

BRIEF DESCRIPTION OF DRAWINGS

FIG. 2b is a schematic flowchart of a data denoising method according to an embodiment of this application;

FIG. 3 is a schematic flowchart of a neural network training method according to an embodiment of this application;

FIG. 7 is a schematic flowchart of a neural network training method according to an embodiment of this application;

FIG. 10A and FIG. 10B are a schematic flowchart of a data denoising method according to an embodiment of this application;

FIG. 13 is a diagram of comparison between clean data generated by using a diffusion probabilistic model and clean data generated according to a method provided in embodiments of this application according to an embodiment of this application;

DESCRIPTION OF EMBODIMENTS

The following describes embodiments of this application with reference to the accompanying drawings. A person of ordinary skill in the art may know that, with development of technologies and emergence of new scenarios, technical solutions provided in embodiments of this application are also applicable to similar technical problems.

In the specification, claims, and accompanying drawings of this application, terms "first", "second", and the like are intended to distinguish between similar objects, but do not necessarily indicate a specific order or sequence. It should be understood that the terms used in such a way are interchangeable in proper circumstances, which is merely a discrimination manner that is used when objects having a same attribute are described in embodiments of this application. In addition, terms "include", "have" and any other variants thereof are intended to cover the non-exclusive inclusion, so that a process, method, system, product, or device that includes a series of units is not necessarily limited to those units, but may include other units not expressly listed or inherent to the process, method, product, or device.

Figure 1A:
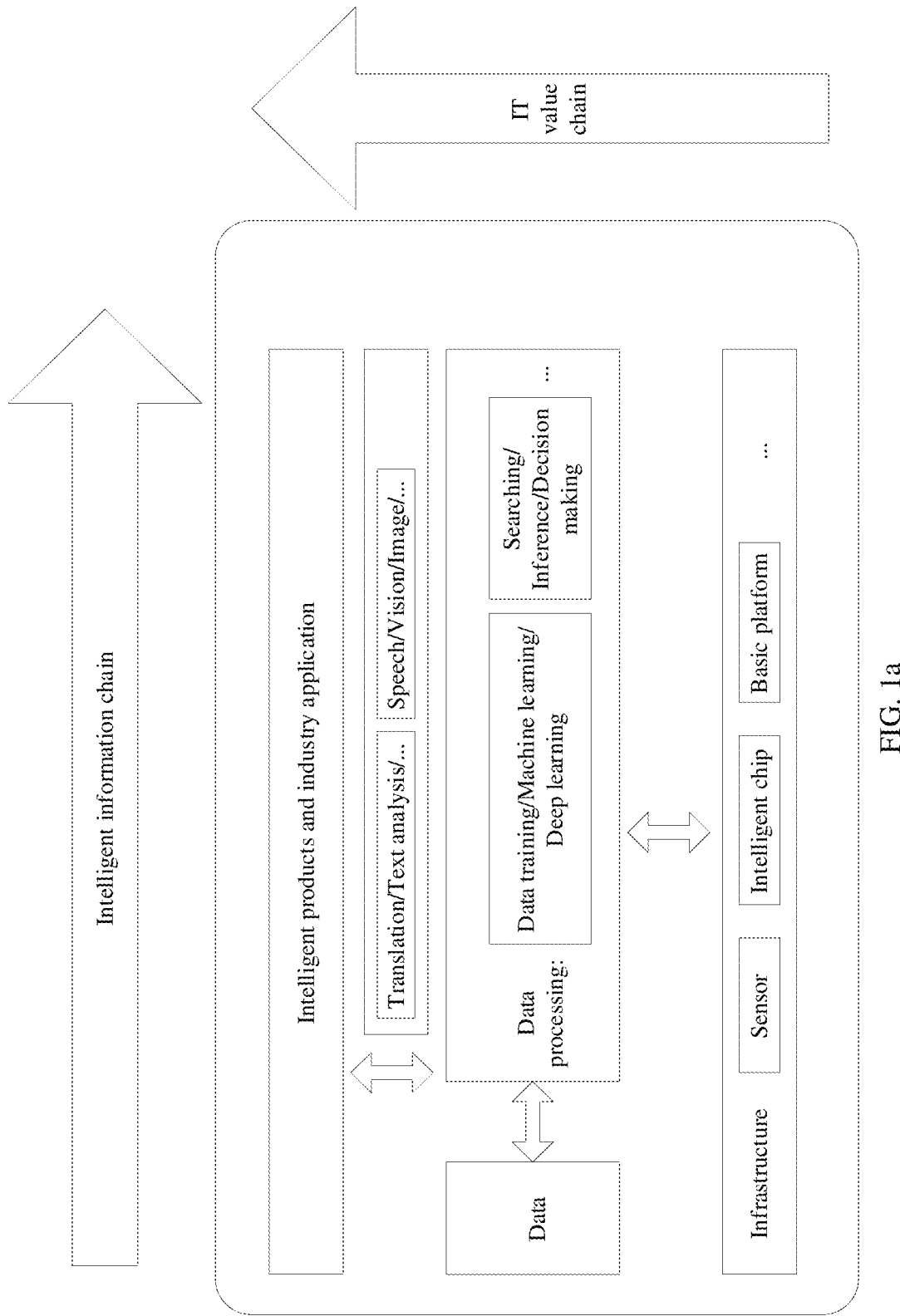
FIG. 1a is a diagram of a structure of an artificial intelligence main framework according to an embodiment of this application.

An overall working procedure of an artificial intelligence system is first described. FIG. 1a is a diagram of a structure of an artificial intelligence main framework. The following describes the artificial intelligence main framework from two dimensions: "intelligent information chain" (horizontal axis) and "IT value chain" (vertical axis). The "intelligent information chain" reflects a series of processes from obtaining data to processing the data. For example, the process may be a general process of intelligent information perception, intelligent information representation and formation, intelligent inference, intelligent decision-making, and intelligent execution and output. In this process, the data undergoes a refinement process of "data-information-knowledge-intelligence". The "IT value chain" reflects a value brought by artificial intelligence to the information technology industry from an underlying infrastructure and information (technical implementation of providing and processing the information) of artificial intelligence to an industrial ecological process of a system.

(1) Infrastructure

The infrastructure provides computing capability support for the artificial intelligence system, implements communication with the outside world, and implements support by using a basic platform. The infrastructure communicates with the outside through a sensor. A computing capability is provided by an intelligent chip. The intelligent chip may be specifically a hardware acceleration chip, for example, a central processing unit (CPU), an embedded neural-network processing unit (NPU), a graphics processing unit (GPU), an application-specific integrated circuit (ASIC), or a field programmable gate array (FPGA). The basic platform includes related platform assurance and support such as a distributed computing framework and a network, and may include cloud storage and computing, an interconnected network, and the like. For example, the sensor communicates with the outside to obtain data, and the data is provided to an intelligent chip in a distributed computing system provided by the basic platform for computing.

(2) Data

Data at an upper layer of the infrastructure indicates a data source in the artificial intelligence field. The data relates to a graph, an image, a speech, and a text, further relates to internet of things data of a conventional device, and includes service data of an existing system and perception data such as force, displacement, a liquid level, a temperature, and humidity.

(3) Data Processing

The data processing usually includes data training, machine learning, deep learning, searching, inference, decision making, and the like.

The machine learning and the deep learning may mean performing symbolic and formal intelligent information modeling, extraction, preprocessing, training, and the like on data.

The inference is a process of performing machine thinking and problem resolving by using formal information according to an inference control policy and by simulating a human intelligent inference manner in a computer or intelligent system. A typical function is searching and matching.

The decision making is a process of making a decision after intelligent information is inferred, and usually provides functions such as classification, ranking, and prediction.

(4) General Capability

After data processing mentioned above is performed on the data, some general capabilities may be further formed based on a data processing result. For example, the general capabilities may be an algorithm or a general system, for example, translation, text analysis, computer vision processing, speech recognition, and image recognition.

(5) Intelligent Products and Industry Application

The intelligent products and the industry application refer to products and application of the artificial intelligence system in various fields, and are packaging of an overall solution of artificial intelligence, so that decision making for intelligent information is productized and application is implemented. Application fields thereof mainly include an intelligent terminal, intelligent manufacturing, intelligent transportation, a smart home, intelligent health care, intelligent security protection, autonomous driving, a smart city, and the like.

This application may be applied to various application fields of artificial intelligence, and is specifically used to perform a denoising operation on noisy data in each application field to obtain clean data corresponding to the noisy data. Further, the noisy data may be specifically represented as pure noise, in other words, the noisy data may not carry information in the clean data; or the noisy data may carry information in the clean data.

Figures 1B, 2A:
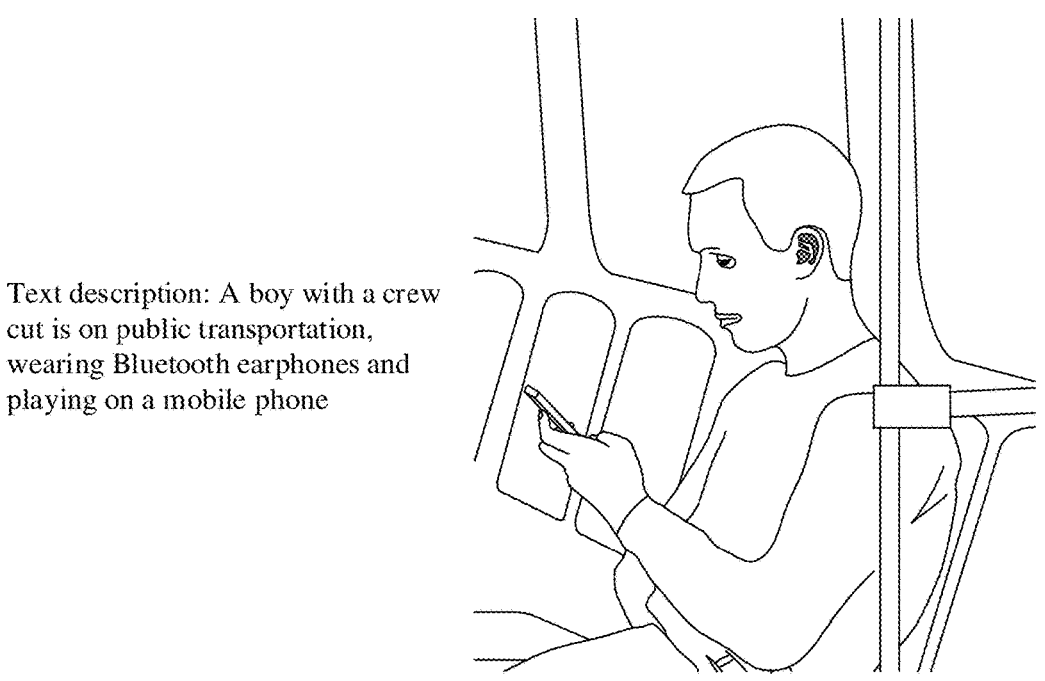
FIG. 1b is a diagram of an application scenario of a data denoising method according to an embodiment of this application.
FIG. 2a is a diagram of a system architecture of a data denoising system according to an embodiment of this application.

In an example, in the field of intelligent terminals, an intelligent terminal may receive a text description input by a user, and display, to the user, an image that meets the text description. A process of generating the image may include performing a plurality of denoising operations on pure noise (that is, an example of noisy data) based on a constraint of the text description (that is, an example of constraint information), to obtain the image (that is, an example of clean data) that meets the constraint of the text description. For more intuitive understanding of this application scenario, refer to FIG. 1b. FIG. 1b is a diagram of an application scenario of a data denoising method according to an embodiment of this application. As shown in the figure, a text description is that a boy with a crew cut is on public transportation, wearing Bluetooth earphones and playing on a mobile phone. In this case, a picture on the right side of FIG. 1b may be generated. It should be understood that the example in FIG. 1b is merely for ease of understanding this solution, and is not intended to limit this solution.

In another example, in the field of intelligent security protection, after collecting an image, a surveillance device disposed in a city may send the collected image to a control center. Noise may be introduced in a process of transmitting the image. In this case, the control center may obtain an image (that is, an example of noisy data) carrying the noise, and may perform a plurality of denoising operations on the image carrying the noise to obtain the clean image (that is, an example of clean data).

In another example, in the field of smart homes, a smart home may provide a translation function. If a Chinese text description needs to be converted into an English speech output, pure noise (that is, an example of noisy data) may be denoised based on a constraint of the Chinese text description (that is, an example of constraint information), to obtain an English speech (that is, an example of clean data) corresponding to the text description. It should be understood that, the example of the application scenario herein is merely for ease of understanding this solution, and is not intended to limit this solution.

Before a data denoising method provided in embodiments of this application is described, refer to FIG. 2a first. FIG. 2a is a diagram of a system architecture of a data denoising system according to an embodiment of this application. In FIG. 2a, the data denoising system 200 includes a training device 210, a database 220, an execution device 230, a data storage system 240, and a client device 250. The execution device 230 includes a computing module 231.

The database 220 stores a training dataset, and the training dataset includes a plurality of pieces of noisy data. The training device 210 generates a first model/rule 201 and a second model/rule 202, and performs iterative training on the first model/rule 201 and the second model/rule 202 by using the training dataset to obtain a trained first model/rule 201 a trained second model/rule 202. The first model/rule 201 may be specifically represented as a neural network, or may be represented as a non-neural network model. In this embodiment of this application, only an example in which both the first model/rule 201 and the second model/rule 202 are represented as feature processing networks is used for description.

The trained first model/rule 201 and the trained second model/rule 202 that are obtained by the training device 210 may be applied to execution devices 230 in different product forms. The execution device 230 may invoke data, code, and the like in the data storage system 240, and may also store data, instructions, and the like into the data storage system 240. The data storage system 240 may be disposed in the execution device 230, or may be an external memory relative to the execution device 230.

The execution device 230 may perform, by using the first model/rule 201 and the second model/rule 202 in the computing module 231, the data denoising method provided in embodiments of this application. Specifically, FIG. 2b is a schematic flowchart of a data denoising method according to an embodiment of this application. The method includes: The execution device 230 performs at least one denoising operation on first noisy data to obtain clean data corresponding to the first noisy data, and any target denoising operation in the at least one denoising operation includes: A1: The execution device 230 obtains first prediction information, where the first prediction information indicates predicted noise between second noisy data and the clean data, the first prediction information is generated by a first feature processing network, and the second noisy data is the first noisy data, or the second noisy data is noisy data obtained by performing at least one denoising operation on the first noisy data. A2: The execution device 230 obtains second prediction information, where the second prediction information indicates a square of the predicted noise between the second noisy data and the clean data, or the second prediction information indicates a square of a distance between the first prediction information and actual noise, the actual noise includes actual noise between the second noisy data and the clean data, the second prediction information is generated by a second feature processing network, and both feature information processed by the first feature processing network and feature information processed by the second feature processing network are obtained based on the second noisy data. A3: The execution device 230 generates, based on the first prediction information and the second prediction information, distribution information corresponding to the target denoising operation. A4: The execution device 230 performs sampling in distribution space to which the distribution information points, to obtain denoised data corresponding to the first noisy data.

Because the execution device 230 can obtain the clean data only after performing N denoising operations, if the target denoising operation is an $N^{th}$ denoising operation, the denoised data may be represented as the clean data; or if the target denoising operation is not an $N^{th}$ denoising operation, denoised data obtained by performing one denoising operation on the first noisy data may be represented as noisy data.

In this embodiment of this application, because the execution device 230 generates, in a process of performing each denoising operation, data between noisy data and the clean data by using the first feature processing network and the second feature processing network, in other words, neither the first feature processing network nor the second feature processing network directly generates distribution information corresponding to the denoising operation, a value of N is not constrained by a training phase. When a quantity of denoising operations needs to be adjusted, the first feature processing network and the second feature processing network do not need to be retrained. According to the denoising solution provided in this embodiment of this application, computer resource overheads caused by repeated training of a neural network are avoided, and flexibility of an inference phase is improved.

In some embodiments of this application, with reference to FIG. 2a, the execution device 230 and the client device 250 may be independent devices. An input/output (I/O) interface is configured for the execution device 230 to exchange data with the client device 250. A "user" may directly interact with the client device 250. The client device 250 performs data communication with the execution device 230 through the I/O interface. After generating clean data by using the first model/rule 201 and the second model/rule 202 in the computing module 231, the execution device 230 may send the clean data to the client device 250 through the I/O interface, to provide the clean data to the user.

It should be noted that FIG. 2a is merely the diagram of the architecture of the data denoising system according to this embodiment of the present invention, and position relationships between devices, components, modules, and the like shown in the figure constitute no limitation. For example, in some other embodiments of this application, the execution device 230 may be configured in the client device 250. In an example, when the client device is a mobile phone or a tablet, the execution device 230 may be a module that is in a host processor (Host CPU) of the mobile phone or the tablet and that is configured to perform a denoising operation, or the execution device 230 may be a neural-network processing unit (NPU) or a graphics processing unit (GPU) of the mobile phone or the tablet. The NPU or the GPU is mounted to the host processor as a coprocessor, and the host processor allocates a task to the NPU or the GPU.

With reference to the foregoing descriptions, the following starts to describe specific implementation procedures of a training phase and an application phase of a neural network provided in embodiments of this application.

I. Training Phase

In embodiments of this application, in a case, second prediction information indicates a square of predicted noise between noisy data and clean data; and in another case, second prediction information indicates a square of a distance between first prediction information and actual noise. Implementation procedures corresponding to the foregoing two cases are different. The following separately describes the foregoing two cases.

(1) The second prediction information indicates the square of the predicted noise between the noisy data and the clean data.

FIG. 3 is a schematic flowchart of a neural network training method according to an embodiment of this application. The neural network training method provided in this embodiment of this application may include the following steps.

301: A training device inputs fourth noisy data into a first feature extraction network, to obtain second feature information generated by the first feature extraction network, where the second feature information includes at least feature information of the fourth noisy data.

In this embodiment of this application, a training dataset is configured on the training device, the training dataset includes a plurality of pieces of training data, and each piece of training data may include noisy data used for training and one piece of clean data corresponding to the noisy data used for training.

Specifically, obtaining of the noisy data corresponding to the clean data is described. After obtaining the clean data, an electronic device may add noise that follows a target data distribution to the clean data, to obtain noisy data obtained by performing one noise addition operation on the clean data; and then add, based on the noisy data, noise that follows the target data distribution, to obtain noisy data obtained by performing two noise addition operations on the clean data. After repeatedly performing the foregoing noise addition operation for M times, the electronic device obtains noisy data generated through an $M^{th}$ step of noise addition operation.

Figure 4:
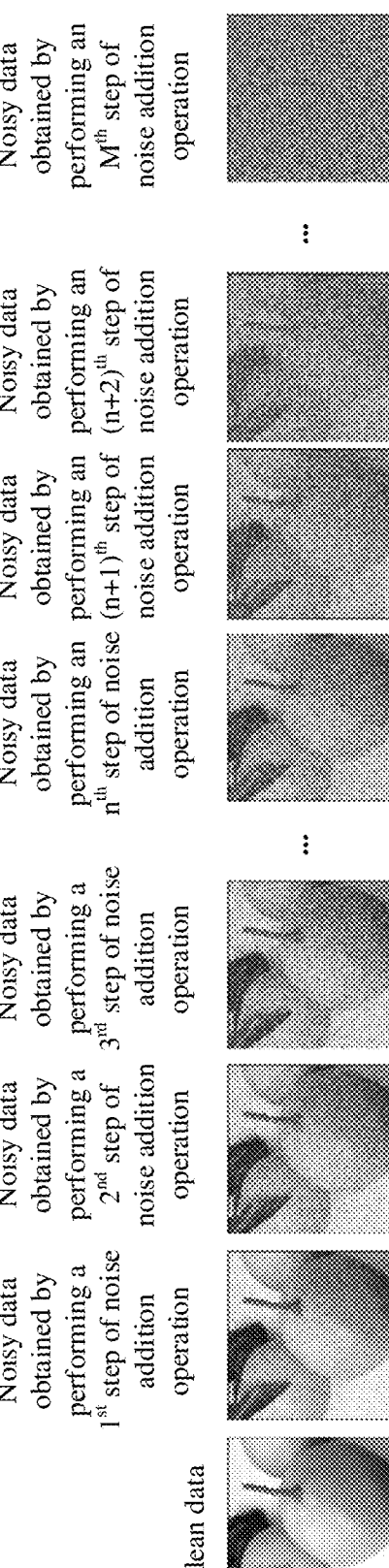
FIG. 4 is a schematic flowchart of performing noise addition on clean data according to an embodiment of this application.

For more intuitive understanding of this solution, refer to FIG. 4. FIG. 4 is a schematic flowchart of performing noise addition on the clean data according to an embodiment of this application. As shown in the figure, after M steps of noise addition operations are performed on the clean data, noisy data used to perform a training operation can be obtained. In a process of each step of noise addition operation, noise that meets the target data distribution may be added to noisy data obtained through a previous step of noise addition operation. It should be understood that the example in FIG. 4 is merely for ease of understanding this solution, and is not intended to limit this solution.

The electronic device may further obtain M−1 pieces of noisy data generated through first M−1 steps of noise addition operations. It should be noted that the electronic device and the training device that perform noise addition operations on the clean data may be a same device. Alternatively, the electronic device and the training device may be two independent devices, in other words, the training device receives the training data sent by the electronic device.

In a process of performing a plurality of noise addition operations on the clean data, generated noisy data continuously loses information in the clean data. The noisy data obtained through the M steps of noise addition operations may be specifically represented as pure noise, in other words, noisy data input into a first neural network does not carry information in the clean data.

One piece of training data may include noisy data obtained by performing n steps of noise addition operations on clean data, a value of n, and the clean data. The value of n is greater than 0 and less than or equal to M. Optionally, the value of n may be determined based on a divisor between M and N. In an example, if a value of M is 1000, and a value of N is 10, the value of n may be 1000, 900, 800, 700, 600, 500, 400, 300, 200, or 100. It should be understood that the example herein is merely for ease of understanding the value of n, and is not intended to limit this solution.

The target data distribution may be a Gaussian distribution, a Gamma distribution, another type of distribution, or the like. This is not exhaustively listed herein. Noise that follows the Gaussian distribution may also be referred to as "Gaussian noise", and noise that follows the Gamma distribution may also be referred to as "Gamma noise", and so on. In this embodiment of this application, denoised data may be sampled in distribution space that follows the Gaussian distribution or the Gamma distribution. In other words, regardless of whether the noise carried in the noisy data is Gaussian noise or Gamma noise, the data denoising method provided in this embodiment of this application may be used to perform denoising. This expands an application scenario of this solution, and improves implementation flexibility of this solution.

The clean data may be specifically used to represent any one of the following types of data: image data, sound data, text data, another type of data, or the like.

Further, the clean data, the noisy data, and noise used in the foregoing denoising operation have a same data size. In other words, the clean data, the noisy data, and the noise used in the denoising operation are all specifically H-dimensional tensors, and all of H dimensions have a same length. In an example, if the clean data is a vector, the noisy data and the noise used in the denoising operation are also vectors, and quantities of values carried in the clean data, the noisy data, and the noise used in the denoising operation are the same. In another example, if the clean data is a matrix, the noisy data and the noise used in the denoising operation are also matrices, and the clean data, the noisy data, and the noise used in the denoising operation are the same in two dimensions: a length and a width. It should be understood that the example herein is merely for ease of understanding a concept of "the same data size", and is not intended to limit this solution.

In some embodiments of this application, the training device may separately train the first neural network and a second neural network, in other words, train the second neural network after generating a trained first neural network, or train the first neural network after generating a trained second neural network. In this case, in one training process of the first neural network, the training device may obtain the fourth noisy data from the training dataset, and input the fourth noisy data and a value of n corresponding to the fourth noisy data into the first feature extraction network, to obtain the second feature information generated by the first feature extraction network, where the second feature information includes at least the feature information of the fourth noisy data.

The first neural network may include the first feature extraction network and a first feature processing network, in other words, a formula of the first neural network may be expressed as $\hat{\epsilon}_n(x_n) = \text{head}(\text{emb}(x_n, n))$. $x_n$ represents noisy data input into the first neural network, n represents a quantity of noise addition operations performed to obtain the noisy data, head( ) is the first feature processing network, and emb( ) is the first feature extraction network.

Further, the first feature extraction network may be a convolutional neural network, a recurrent neural network, a residual neural network, another type of neural network, or the like. Correspondingly, the first feature processing network may also be any type of neural network. A specific structure of the first neural network may be determined with reference to a type of data that is actually processed.

Figure 5:
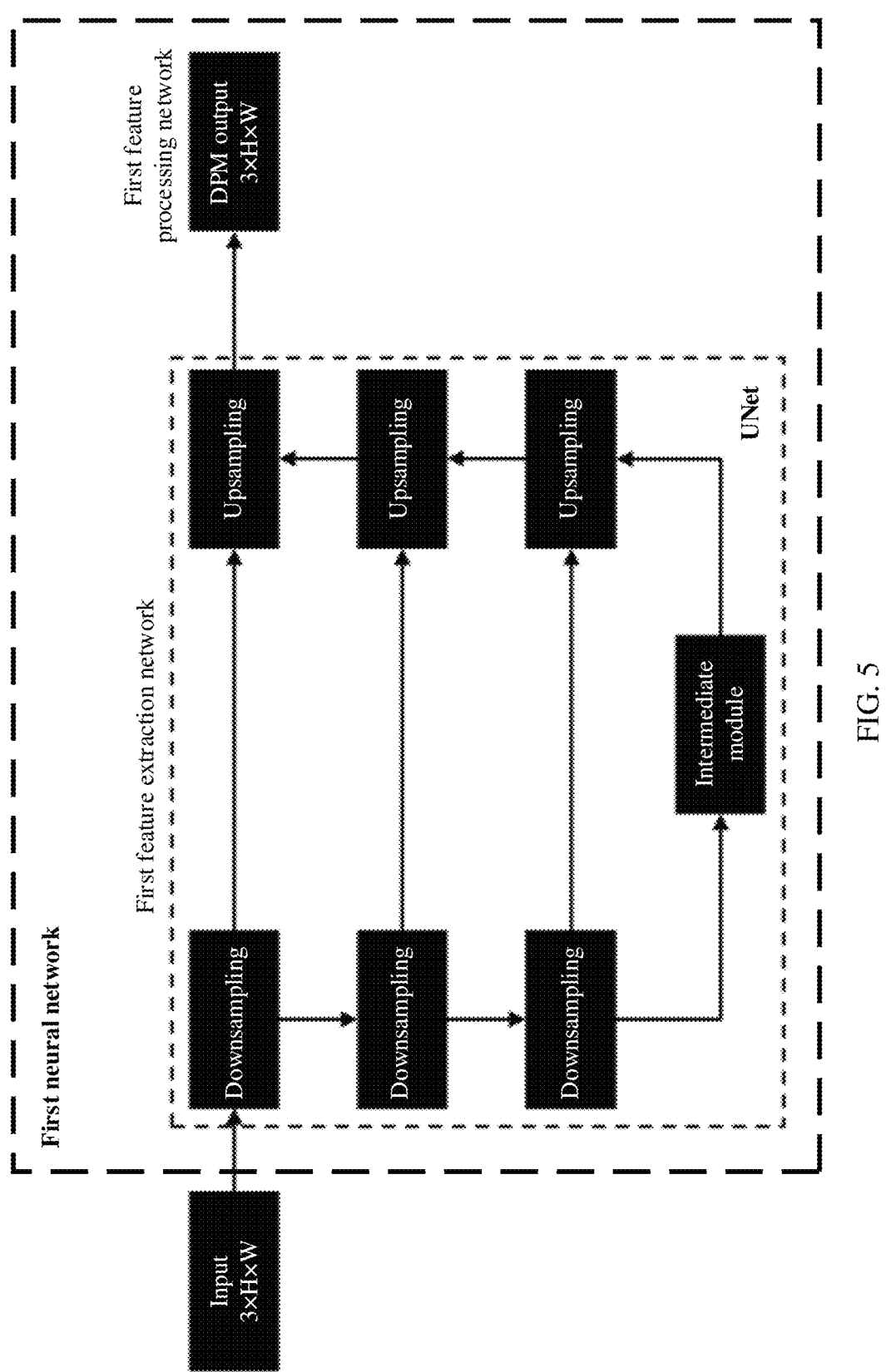
FIG. 5 is a diagram of a structure of a first neural network according to an embodiment of this application.

In an example, the first feature extraction network may be specifically a U-shaped neural network (UNet), where the UNet is a neural network architecture presented with a U-shaped structure; and the first feature processing network may be specifically a diffusion probabilistic model (DPM). For more intuitive understanding of this solution, refer to FIG. 5. FIG. 5 is a diagram of a structure of the first neural network according to an embodiment of this application. As shown in FIG. 5, the first feature extraction network included in the first neural network is a UNet, and the first feature processing network included in the first neural network may be a DPM. It should be understood that the example in FIG. 5 is merely for ease of understanding this solution, and is not intended to limit this solution.

Optionally, the training device may input the fourth noisy data, the value of n corresponding to the fourth noisy data, and second constraint information into the first feature extraction network, to obtain the second feature information generated by the first feature extraction network. The second feature information includes the fourth noisy data and feature information of the second constraint information. The fourth noisy data may be pure noise, or may be data carrying information in second clean data.

The second clean data meets a constraint of the second constraint information. In an example, the second constraint information is a text description, the second clean data is a sound of a specific person reading the text description, and the fourth noisy data is pure noise used to express sound data. In another example, the second constraint information is a text description, the second clean data is an image that meets the text description, and the fourth noisy data is pure noise used to express image data. It should be noted that the example herein is merely for ease of understanding a concept of "constraint information", and is not intended to limit this solution.

302: The training device processes the second feature information by using the first feature processing network, to obtain first prediction information output by the first feature processing network, where the first feature extraction network and the first feature processing network are included in the first neural network.

In this embodiment of this application, after generating the second feature information by using the first feature extraction network, the training device may process the second feature information by using the first feature processing network, to obtain the first prediction information output by the first feature processing network, in other words, obtain the first prediction information output by the entire first neural network. The first prediction information indicates predicted noise between the fourth noisy data and the second clean data, and the first prediction information and the noisy data have a same data size.

303: The training device trains the first neural network based on second expectation information corresponding to the fourth noisy data, the first prediction information, and a target loss function, where the target loss function indicates a similarity between the first prediction information and the second expectation information, and the second expectation information indicates actual noise between the fourth noisy data and the second clean data.

In this embodiment of this application, the training device may obtain, based on training data to which the fourth noisy data belongs, the second expectation information corresponding to the fourth noisy data, where the second expectation information indicates the actual noise between the fourth noisy data and the second clean data. The training device calculates a function value of the target loss function based on the second expectation information and the first prediction information, where the target loss function indicates the similarity between the first prediction information and the second expectation information.

The training device performs gradient derivation on the function value of the target loss function, and reversely updates parameters of the first neural network, to implement one time of training on the first neural network. The training device may repeatedly perform steps 301 to 303, to implement iterative training on the first neural network until a first convergence condition is met, to obtain a trained first neural network, in other words, obtain a trained first feature extraction network and a trained first feature processing network.

The first convergence condition may be a convergence condition that meets the target loss function, a quantity of times of iterative training on the first neural network reaching a preset quantity of times, another type of convergence condition, or the like. This is not limited herein.

304: The training device inputs third noisy data into a second feature extraction network, to obtain first feature information generated by the second feature extraction network, where the first feature information includes at least feature information of the third noisy data.

In this embodiment of this application, the training device may initialize the second neural network. The second neural network may include the second feature extraction network and a second feature processing network. Because the second neural network and the first neural network output different prediction information, the second neural network and the first neural network include different feature processing networks.

For the second feature extraction network in the second neural network, in an implementation, if the training device first trains the first neural network to obtain the trained first neural network, the trained first feature extraction network may be used as the second feature extraction network of the second neural network, and a parameter of the second feature extraction network remains unchanged in a training process of the second neural network, in other words, the parameter of the second feature extraction network is no longer updated in the training process of the second neural network, so that the trained first neural network and the second neural network include a same feature extraction network.

A formula of the second neural network may be expressed as $h_n(x_n)=\text{head}_\phi(\text{emb}(x_n,n))$. $x_n$ represents noisy data input into the second neural network; n represents a quantity of noise addition operations performed to obtain the noisy data; emb( ) represents the second feature extraction network (namely, the trained first feature extraction network), where the parameter of the second feature extraction network may be fixed in the training process of the second neural network; and $\text{head}_\phi( )$ represents the second feature processing network.

Figure 6:
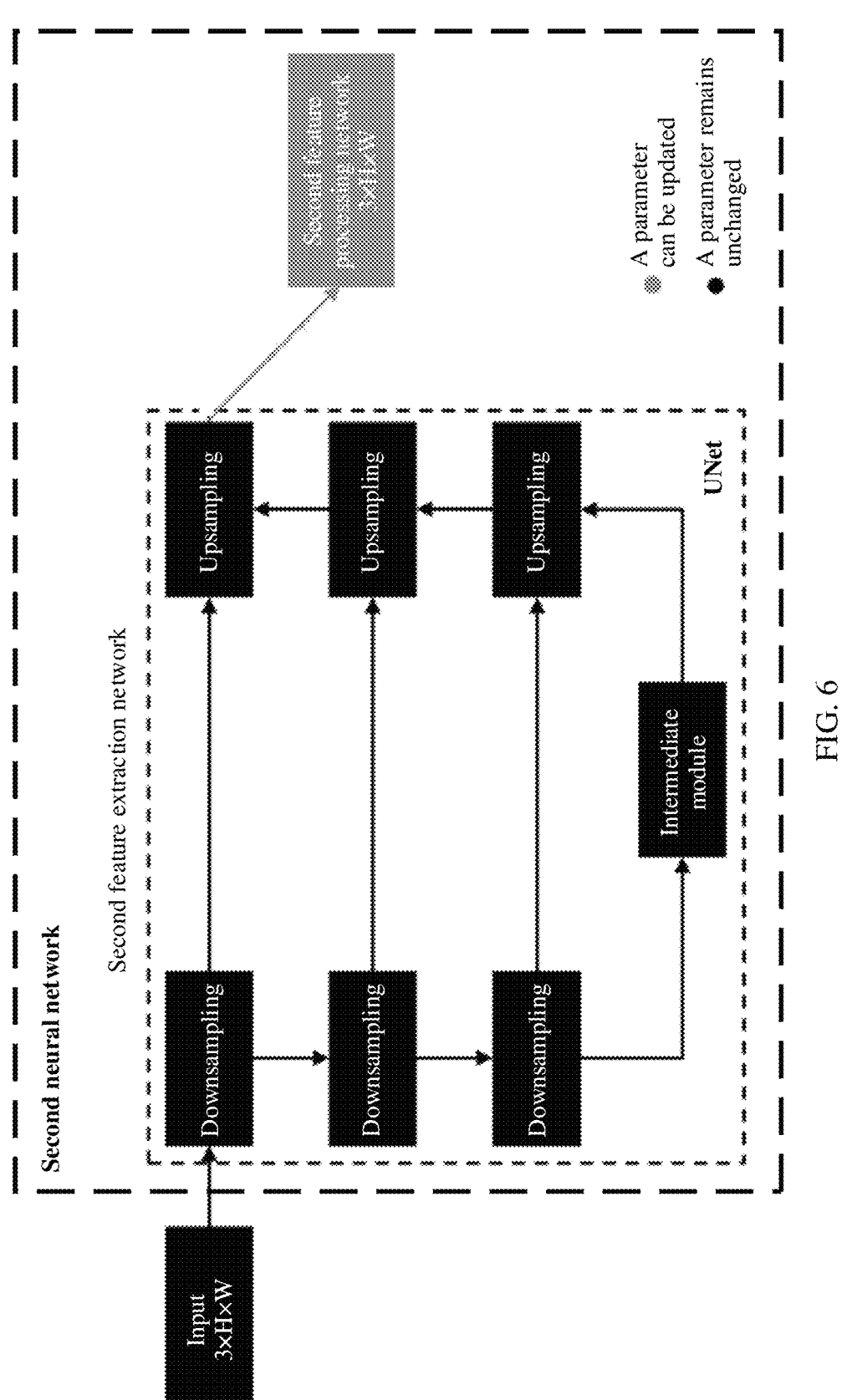
FIG. 6 is a diagram of a structure of a second neural network according to an embodiment of this application.

For more intuitive understanding of this solution, refer to FIG. 6. FIG. 6 is a diagram of a structure of the second neural network according to an embodiment of this application. As shown in FIG. 6, the second feature extraction network included in the second neural network is a UNet, and the second feature extraction network may be from the trained first neural network. In the training process of the second neural network, the parameter of the second feature extraction network may remain unchanged, and a parameter of the second feature processing network is updated. It should be understood that the example in FIG. 6 is merely for ease of understanding this solution, and is not intended to limit this solution.

In another implementation, the training device first trains the first neural network to obtain the trained first neural network. In this case, the training device may use the trained first feature extraction network as the second feature extraction network of the second neural network, and update a parameter of the second feature extraction network in a training process of the second neural network.

In another implementation, the training device may re-initialize the second feature extraction network in the second neural network, and the second feature extraction network and the first feature extraction network are different neural networks. It should be noted that, for specific types of neural networks represented by the second feature extraction network and the second feature processing network, refer to the descriptions in step 301. Details are not described herein again.

In this embodiment of this application, the training device obtains the third noisy data from the training dataset, and inputs the third noisy data and a value of n corresponding to the third noisy data into the second feature extraction network to obtain the first feature information generated by the second feature extraction network, where the first feature information includes at least the feature information of the third noisy data.

Optionally, the training device may input the third noisy data, the value of n corresponding to the third noisy data, and first constraint information into the second feature extraction network, to obtain the first feature information generated by the second feature extraction network. The first feature information includes the third noisy data and feature information of the first constraint information. The third noisy data may be pure noise, or may be data carrying information in first clean data.

It should be noted that, if the first neural network and the second neural network use a same feature extraction network, data input into the first neural network and data input into the second neural network are the same. If the first neural network and the second neural network use different feature extraction networks, constraint information may be input into the first neural network and the constraint information is not input into the second neural network, or constraint information may be input into both the first neural network and the second neural network.

305: The training device processes the first feature information by using the second feature processing network, to obtain second prediction information output by the second feature processing network, where the second prediction information indicates a square of predicted noise between the third noisy data and the first clean data.

In this embodiment of this application, after generating the first feature information by using the second feature processing network, the training device may process the first feature information by using the second feature processing network, to obtain the second prediction information output by the second feature processing network, in other words, obtain the second prediction information output by the entire second neural network.

The second prediction information and the noisy data have a same data size, and the second prediction information indicates the square of the predicted noise between the third noisy data and the first clean data. Further, the square of the predicted noise between the third noisy data and the first clean data may be a square of each value in the predicted noise between the third noisy data and the first clean data.

306: The training device trains the second feature processing network based on first expectation information corresponding to the third noisy data, the second prediction information, and a first loss function, where the first loss function indicates a similarity between the second prediction information and the first expectation information, and the first expectation information indicates a square of actual noise between the third noisy data and the first clean data.

In this embodiment of this application, the training device may obtain, based on training data to which the third noisy data belongs, the first expectation information corresponding to the third noisy data, where the first expectation information indicates the square of the actual noise between the third noisy data and the first clean data. The training device calculates a function value of the first loss function based on the first expectation information and the second prediction information, where the first loss function indicates the similarity between the second prediction information and the first expectation information.

The first loss function may be a formula of a cosine similarity between the second prediction information and the first expectation information. Alternatively, the first loss function may be a formula of an L2 distance or a Euclidean distance between the second prediction information and the first expectation information, or may be another type of formula or the like. This is not exhaustively listed herein.

In an example, a formula of the first loss function may be $\|h_n(x_n)-\epsilon_n^2\|_2^2$. $h_n(x_n)$ represents second prediction information output by the second neural network, $\epsilon_n^2$ represents a square of actual noise between noisy data and clean data (that is, second expectation information), and $\|h_n(x_n)-\epsilon_n^2\|_2^2$ represents a mean square error between the second prediction information and the second expectation information (that is, an L2 distance between the second prediction information and the first expectation information). It should be understood that the example herein is merely used to prove implementability of this solution, and is not intended to limit this solution.

For a process in which the training device updates a parameter of the second neural network, in an implementation, the second feature extraction network is from the trained first neural network, in other words, the second feature extraction network is the trained first feature extraction network. In this case, the training device may perform gradient derivation on the function value of the first loss function, keep the parameter of the second feature extraction network unchanged, and update the parameter of the second feature processing network in the second neural network, to implement one time of training on the second neural network.

In another implementation, the training device may perform gradient derivation on the function value of the first loss function, and reversely update parameters of the entire second neural network, to implement one time of training on the second neural network.

The training device may repeatedly perform steps 304 to 306, to implement iterative training on the second neural network until a second convergence condition is met, to obtain the trained second neural network, in other words, obtain a trained second feature processing network. The second convergence condition may be a convergence condition that meets the first loss function, a quantity of times of iterative training on the second neural network reaching a preset quantity of times, another type of convergence condition, or the like. This is not limited herein.

It should be noted that an execution sequence of steps 301 to 306 is not limited in this embodiment of this application. If the first neural network and the second neural network are separately trained, steps 304 to 306 may be first performed, and then steps 301 to 303 are performed. In this case, the first feature extraction network in the first neural network may use the trained second feature extraction network. If the first neural network and the second neural network are simultaneously trained, same noisy data may be separately input into the first neural network and the second neural network, to train the first neural network and the second neural network.

Further, in an inference phase, first prediction information (to be specific, predicted noise between noisy data and clean data) output by the first feature processing network and second prediction information output by the second feature processing network are used to jointly generate distribution information corresponding to a denoising operation, so that sampling can be performed in distribution space to which the distribution information points, to obtain denoised data corresponding to the noisy data (namely, denoised data obtained through one denoising operation). A specific implementation principle is described in detail in a subsequent method for the inference phase.

(2) The second prediction information indicates the square of the distance between the first prediction information and the actual noise.

FIG. 7 is a schematic flowchart of a neural network training method according to an embodiment of this application. The neural network training method provided in this embodiment of this application may include the following steps.

701: A training device inputs fourth noisy data into a first feature extraction network, to obtain second feature information generated by the first feature extraction network, where the second feature information includes at least feature information of the fourth noisy data.

702: The training device processes the second feature information by using a first feature processing network, to obtain first prediction information that is output by the first feature processing network and that corresponds to the fourth noisy data, where the first prediction information corresponding to the fourth noisy data indicates predicted noise between the fourth noisy data and second clean data, and the first feature extraction network and the first feature processing network are included in a first neural network.

703: The training device trains the first neural network based on second expectation information corresponding to the fourth noisy data, the first prediction information, and a target loss function, where the target loss function indicates a similarity between the first prediction information and the second expectation information that correspond to the fourth noisy data, and the second expectation information indicates actual noise between the fourth noisy data and the second clean data.

In this embodiment of this application, for specific implementations of steps 701 to 703, refer to the descriptions in steps 301 to 303 in the embodiment corresponding to FIG. 3. For specific meanings of nouns in steps 701 to 703, refer to the descriptions in the embodiment corresponding to FIG. 3. Details are not described herein again.

704: The training device inputs third noisy data into the first neural network, to obtain first prediction information that is output by the first neural network and that corresponds to the third noisy data, where the first prediction information corresponding to the third noisy data indicates predicted noise between the third noisy data and first clean data.

In some embodiments of this application, if the training device synchronously trains the first neural network and a second neural network, in other words, same noisy data is input into the first neural network and the second neural network, steps 701 to 703 may not be performed, and step 704 may be directly performed. If the training device first trains the first neural network and then trains a second neural network, to generate second expectation information, the third noisy data further needs to be input into a trained first neural network, to obtain the first prediction information that is output by the trained first neural network and that corresponds to the third noisy data. The first prediction information corresponding to the third noisy data indicates the predicted noise between the third noisy data and the first clean data.

For a specific implementation of step 704, refer to the descriptions in steps 301 and 302 in the embodiment corresponding to FIG. 3. For specific meanings of nouns in step 704, refer to the descriptions in the embodiment corresponding to FIG. 3. Details are not described herein again.

705: The training device inputs the third noisy data into a second feature extraction network, to obtain first feature information generated by the second feature extraction network, where the first feature information includes at least feature information of the third noisy data.

In this embodiment of this application, for a specific implementation of step 705, refer to the descriptions in step 304 in the embodiment corresponding to FIG. 3. For specific meanings of nouns in step 705, refer to the descriptions in the embodiment corresponding to FIG. 3. Details are not described herein again.

706: The training device processes the first feature information by using a second feature processing network, to obtain second prediction information output by the second feature processing network, where the second prediction information indicates a square of a predicted distance between the first prediction information and first actual noise, and the first actual noise includes actual noise between the third noisy data and the first clean data.

In this embodiment of this application, the training device may process the first feature information by using the second feature processing network, to obtain the second prediction information output by the second feature processing network, in other words, obtain the second prediction information output by the entire second neural network. The second prediction information in this embodiment indicates the square of the predicted distance between the first prediction information and the first actual noise, and the first actual noise includes the actual noise between the third noisy data and the first clean data.

707: The training device trains the second feature processing network based on the second expectation information corresponding to the third noisy data, the second prediction information, and a second loss function, where the second loss function indicates a similarity between the second prediction information and the second expectation information, and the second expectation information indicates a square of an actual distance between the first prediction information corresponding to the third noisy data and the first actual noise.

In this embodiment of this application, the training device may generate the second expectation information based on the first prediction information corresponding to the third noisy data and the first actual noise, where the second expectation information indicates the square of the actual distance between the first prediction information corresponding to the third noisy data and the first actual noise. A function value of the second loss function is generated based on the second expectation information and the second prediction information that correspond to the third noisy data, where the second loss function indicates the similarity between the second prediction information and the second expectation information that correspond to the third noisy data.

The "actual distance between the first prediction information corresponding to the third noisy data and the first actual noise" may be specifically a residual, a cosine distance, an L2 distance, another distance, or the like between the first prediction information corresponding to the third noisy data and the first actual noise. This is not exhaustively listed herein.

The second loss function may be specifically a formula of a cosine similarity between the second prediction information and the second expectation information. Alternatively, the second loss function may be a formula of an L2 distance or a Euclidean distance between the second prediction information and the second expectation information, or may be another type of formula or the like. This is not exhaustively listed herein.

In an example, a formula of the "square of the actual distance between the first prediction information corresponding to the third noisy data and the first actual noise" may be $(\hat{\epsilon}_n(x_n)-\epsilon_n)^2$. $x_n$ represents input noisy data, $\hat{\epsilon}_n(x_n)$ represents prediction information (to be specific, predicted noise between the noisy data and clean data) generated by the first neural network, $\epsilon_n$ represents actual noise between the input noisy data and the clean data, and $(\hat{\epsilon}_n(x_n)-\epsilon_n)^2$ represents a square of a residual between the prediction information generated by the first neural network and the actual noise.

For example, a formula of the second loss function may be $\|g_n(x_n)-(\hat{\epsilon}_n(x_n)-\epsilon_n)^2\|_2^2$. $x_n$ represents noisy data input into the second neural network, $g_n(x_n)$ represents second prediction information output by the second neural network, $(\hat{\epsilon}_n(x_n)-\epsilon_n)^2$ represents a square of a residual between prediction information generated by the first neural network and actual noise (that is, second expectation information), and $\|g_n(x_n)-(\hat{\epsilon}_n(x_n)-\epsilon_n)^2\|_2^2$ represents an L2 distance between the second prediction information and the second expectation information. It should be understood that the examples of the "actual distance between the first prediction information corresponding to the third noisy data and the first actual noise" and the second loss function herein are merely for ease of understanding this solution, and is not intended to limit this solution.

For a process in which the training device updates parameters of the second neural network, in an implementation, the second feature extraction network is from the trained first neural network, in other words, the second feature extraction network is a trained first feature extraction network. In this case, the training device may perform gradient derivation on the function value of the second loss function, keep a parameter of the second feature extraction network unchanged, and update a parameter of the second feature processing network in the second neural network, to implement one time of training on the second neural network.

In another implementation, the training device may perform gradient derivation on the function value of the second loss function, and reversely update the parameters of the entire second neural network, to implement one time of training on the second neural network.

The training device may repeatedly perform steps 704 to 707, to implement iterative training on the second neural network until a third convergence condition is met, to obtain the trained second neural network, in other words, obtain a trained second feature processing network. The third convergence condition may be a convergence condition that meets the second loss function, a quantity of times of iterative training on the second neural network reaching a preset quantity of times, another type of convergence condition, or the like. This is not limited herein.

It should be noted that, if the training device synchronously trains the first neural network and the second neural network, steps 701 to 704 do not need to be performed, and the training device further needs to train the first neural network based on the second expectation information corresponding to the third noisy data, the first prediction information corresponding to the third noisy data, and the target loss function. The target loss function indicates a similarity between the first prediction information and the second expectation information, and the second expectation information corresponding to the third noisy data indicates the actual noise between the third noisy data and the first clean data.

Figure 8:
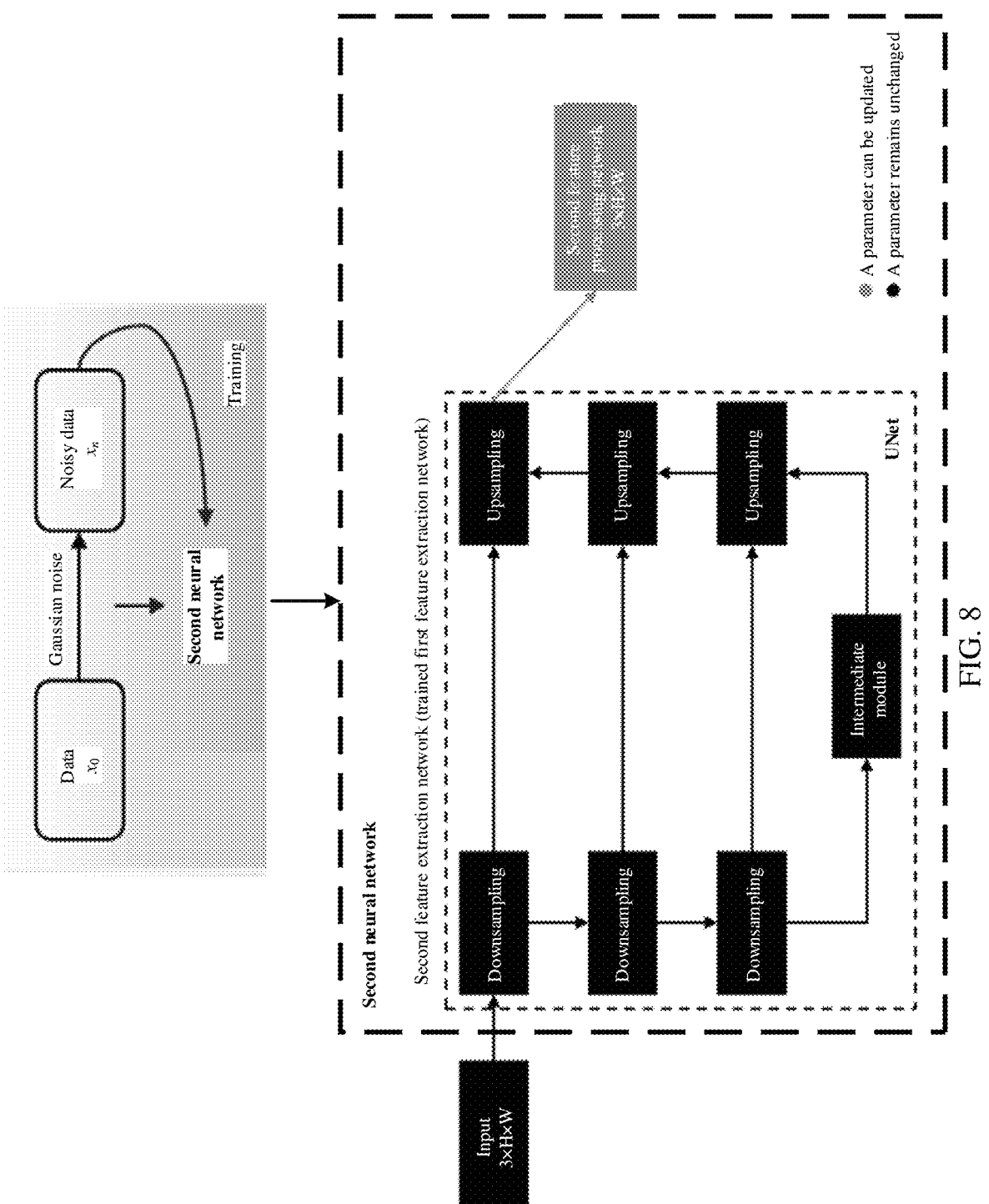
FIG. 8 is a schematic flowchart of a neural network training method according to an embodiment of this application.

For more intuitive understanding of this solution, refer to FIG. 8. FIG. 8 is a schematic flowchart of the neural network training method according to an embodiment of this application. FIG. 8 shows a training process of the second neural network. In a training phase, after M noise addition operations are performed on each piece of clean data $x_0$, pure noise corresponding to the clean data $x_0$ can be obtained. In a process of performing the M noise addition operations, M pieces of noisy data can be obtained, and one or more pieces of noisy data $x_n$ are obtained from the M pieces of noisy data. The training device may first train the first neural network by using a plurality of pieces of noisy data $x_n$, to obtain the trained first neural network. The trained first neural network includes the trained first feature extraction network and a trained first feature processing network.

The training device determines the trained first feature extraction network as the second feature extraction network included in the second neural network, keeps the parameter of the second feature extraction network unchanged, and updates the parameter of the second feature extraction network based on a plurality of pieces of noisy data $x_n$. For specific training details of the first neural network and the second neural network, refer to the descriptions in the foregoing embodiment. Details are not described herein. It should be understood that the example in FIG. 8 is merely for ease of understanding this solution, and is not intended to limit this solution.

II. Inference Phase

Figure 9:
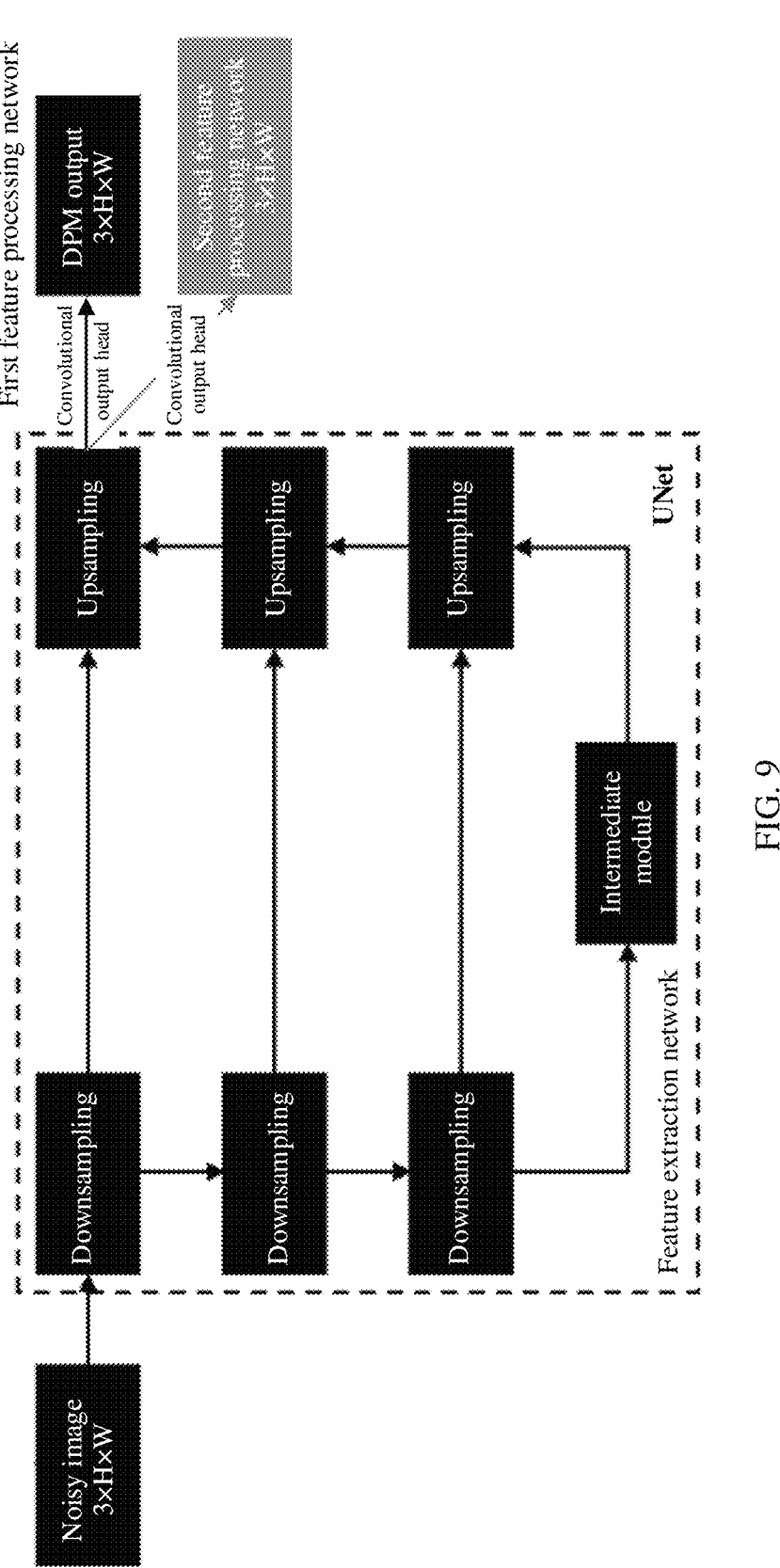
FIG. 9 is a diagram of deployment of neural networks in a data denoising method according to an embodiment of this application.

In embodiments of this application, a trained first feature processing network and a trained second feature processing network are deployed on an execution device. In an implementation, FIG. 9 is a diagram of deployment of neural networks in a data denoising method according to an embodiment of this application. As shown in FIG. 9, a trained feature extraction network, a trained first feature processing network, and a trained second feature processing network are deployed on an execution device, in other words, the first feature processing network and the second feature processing network use a same feature extraction network. In this case, the first feature processing network and the second feature processing network are used to process same feature information. It should be understood that the example in FIG. 9 is merely for ease of understanding this solution. The first feature processing network and the second feature processing network may alternatively be deployed on the execution device in another manner. This is not limited herein.

In another implementation, a first neural network and a second neural network are separately deployed on the execution device. A first feature extraction network included in the first neural network and a second feature extraction network included in the second neural network may be a same neural network, or may be different neural networks. If the first feature extraction network and the second feature extraction network are a same neural network, the first feature processing network and the second feature processing network are used to process same feature information.

In embodiments of this application, the first feature processing network and the second feature processing network process the same feature information, in other words, the first feature processing network and the second feature processing network correspond to a same feature extraction network or the first feature processing network and the second feature processing network correspond to a same feature extraction network, in other words, only one feature extraction network needs to be trained in a training phase. This helps improve efficiency of the training phase.

Specifically, FIG. 10A and FIG. 10B are a schematic flowchart of a data denoising method according to an embodiment of this application. The data denoising method provided in this embodiment of this application may include the following steps.

1001: An execution device generates, by using a first feature processing network, first prediction information corresponding to first noisy data, where the first prediction information corresponding to the first noisy data indicates predicted noise between the first noisy data and target clean data.

In this embodiment of this application, if the execution device performs at least one denoising operation on the first noisy data to obtain the target clean data corresponding to the first noisy data, the execution device needs to generate, by using the first feature processing network, the first prediction information corresponding to the first noisy data, where the first prediction information corresponding to the first noisy data indicates the predicted noise between the first noisy data and the target clean data.

The first noisy data may be pure noise, in other words, the first noisy data does not carry information in the target clean data; or the first noisy data may carry information in the target clean data.

Specifically, in an implementation, if the first feature processing network and a second feature processing network use a same feature extraction network, the execution device may determine a value of n corresponding to the first noisy data, and input the first noisy data and the value of n corresponding to the first noisy data into the feature extraction network, to obtain target feature information that is generated by the feature extraction network and that corresponds to the first noisy data, where the target feature information includes at least feature information of the first noisy data.

If the first noisy data is pure noise, the value of n may be M, and a value of N is a preconfigured hyperparameter. If the first noisy data is not pure noise, the execution device may estimate values of n and N based on the first noisy data. If more noise is carried in the first noisy data, the value of n is closer to M, and a value of N is larger. If more noise is carried in the first noisy data, the values of n and N are smaller.

Optionally, the execution device inputs the first noisy data, the value of n corresponding to the first noisy data, and target constraint information into the feature extraction network, to obtain the target feature information generated by the feature extraction network, where the target feature information includes the feature information of the first noisy data and feature information of the target constraint information.

The execution device processes the target feature information by using the first feature processing network, to obtain the first prediction information that is generated by the first feature processing network and that corresponds to the first noisy data.

In another implementation, if a first neural network and a second neural network are separately deployed on the execution device, the execution device may input the first noisy data into the first neural network, to obtain target feature information that is generated by a first feature extraction network in the first neural network and that corresponds to the first noisy data, where the target feature information includes at least feature information of the first noisy data.

Optionally, the execution device inputs the first noisy data and target constraint information into the first neural network, to obtain the target feature information generated by the first feature extraction network in the first neural network, where the target feature information includes the feature information of the first noisy data and feature information of the target constraint information.

The execution device processes the target feature information by using the first feature processing network in the first neural network, to obtain the first prediction information that is generated by the first neural network and that corresponds to the first noisy data.

1002: The execution device generates, by using the second feature processing network, second prediction information corresponding to the first noisy data, where the second prediction information corresponding to the first noisy data indicates a square of the predicted noise between the first noisy data and the target clean data, or the second prediction information indicates a square of a predicted distance between the first prediction information and target actual noise, and the target actual noise includes actual noise between the first noisy data and the target clean data.

In this embodiment of this application, the execution device needs to generate, by using the second feature processing network, the second prediction information corresponding to the first noisy data, where the second prediction information corresponding to the first noisy data indicates the square of the predicted noise between the first noisy data and the target clean data, or the second prediction information indicates the square of the predicted distance between the first prediction information and the target actual noise, and the target actual noise includes the actual noise between the first noisy data and the target clean data.

Specifically, in an implementation, if the first feature processing network and the second feature processing network use the same feature extraction network, the execution device may obtain the target feature information that is generated by the feature extraction network and that corresponds to the first noisy data, and process the target feature information by using the second feature processing network to obtain the second prediction information that is generated by the second feature processing network and that corresponds to the first noisy data.

The target feature information corresponding to the first noisy data includes at least the feature information of the first noisy data. Optionally, the target feature information includes the feature information of the first noisy data and the feature information of the target constraint information.

In another implementation, if the first neural network and the second neural network are separately deployed on the execution device, the execution device may input the first noisy data into the second neural network, to obtain target feature information that is generated by a second feature extraction network in the second neural network and that corresponds to the first noisy data, where the target feature information includes at least the feature information of the first noisy data.

Optionally, the execution device inputs the first noisy data and the target constraint information into the second neural network, to obtain the target feature information generated by the second feature extraction network in the second neural network, where the target feature information includes the feature information of the first noisy data and the feature information of the target constraint information.

The execution device processes the target feature information by using the second feature processing network in the second neural network, to obtain the second prediction information that is generated by the second neural network and that corresponds to the first noisy data.

It should be noted that, for specific meanings of nouns in steps 1001 and 1002, refer to the descriptions in the embodiments corresponding to FIG. 3 and FIG. 7. Details are not described herein again.

In this embodiment of this application, denoising operations may be continuously performed on the pure noise (that is, no information in the clean data is carried) based on the constraint information, to obtain the clean data that meets the constraint information. In other words, the clean data that meets the constraint information can be generated from nothing by using the first neural network and the second neural network. This expands a specific channel for obtaining the clean data.

1003: The execution device generates, based on the first prediction information and the second prediction information that correspond to the first noisy data, distribution information corresponding to a target denoising operation.

In this embodiment of this application, for any denoising operation (for ease of description, referred to as the "target denoising operation" subsequently) in N denoising operations performed by the execution device on the first noisy data, the execution device may obtain the first prediction information and the second prediction information that correspond to the first noisy data, and determine that an $H^{th}$ denoising operation in the N denoising operations is being currently performed. Different denoising operations in the N denoising operations may correspond to different distribution information. A training device generates, based on the first prediction information and the second prediction information that correspond to the first noisy data, the distribution information corresponding to the target denoising operation.

In a training phase, the pure noise is obtained by performing M steps of noise addition processes on the clean data. Therefore, correspondingly, the clean data can be obtained by performing M steps of denoising operations on the pure noise, and an ideal state is that a process of obtaining denoised data by each denoising operation is a complete inverse process of a corresponding noise addition operation. In an example, if a value of M is 1000, in the ideal state, denoised data obtained by a $1^{st}$ denoising operation is consistent with noisy data obtained by a $999^{th}$ noise addition operation. In another example, if a value of M is 1000, in the ideal state, denoised data obtained by a $100^{th}$ denoising operation is consistent with noisy data obtained by a $900^{th}$ step of noise addition operation. It should be understood that the example herein is merely for ease of understanding this solution, and is not intended to limit this solution.

To improve efficiency of an inference phase, in this solution, only the N denoising operations are performed in the inference phase, and the value of N is far less than s. In this case, an objective of each of the N denoising operations is to obtain, based on noisy data corresponding to an $n^{th}$ step of noise addition operation in M steps of noise addition operations, noisy data corresponding to an $s^{th}$ step of noise addition operation in the M steps of noise addition operations. Both n and s are positive integers, a value of n is greater than a value of s, and a difference between n and s is greater than or equal to 2. In other words, each of the N denoising operations includes achieving denoising effect of a plurality of denoising operations in the M steps of denoising operations in the ideal state.

In an example, if the value of M is 1000, and the value of N is 10, an objective of a $1^{st}$ denoising operation in 10 denoising operations is to generate, based on noisy data obtained through 1000 steps of noise addition operations, noisy data obtained through 900 steps of noise addition operations. That is, in the $1^{st}$ denoising operation, if a value of n is 1000, a value of s is 900.

An objective of a $2^{nd}$ denoising operation in the 10 denoising operations is to generate, based on the noisy data obtained through the 900 steps of noise addition operations, noisy data obtained through 800 steps of noise addition operations. That is, in the $2^{nd}$ denoising operation, if a value of n is 900, a value of s is 800.

An objective of a $3^{rd}$ denoising operation in the 10 denoising operations is to generate, based on the noisy data obtained through the 800 steps of noise addition operations, noisy data obtained through 700 steps of noise addition operations. That is, in the $3^{rd}$ denoising operation, if a value of n is 800, a value of s is 700. Seven remaining denoising operations in the 10 denoising operations may be deduced by analogy, and effect to be implemented by the seven remaining denoising operations is not described herein again.

Specifically, if distribution space corresponding to a denoising operation follows a Gaussian distribution or a Gamma distribution, the execution device may generate, based on the first prediction information corresponding to the first noisy data, an average value corresponding to the target denoising operation; and generate, based on the second prediction information corresponding to the first noisy data, a covariance corresponding to the target denoising operation. The average value and the covariance that correspond to the target denoising operation can point to specific distribution space.

More specifically, the execution device may determine values of n and s that correspond to the $H^{th}$ denoising operation (namely, the target denoising operation) in the N denoising operations; and generate, based on the first prediction information corresponding to the first noisy data, a value of n, and a value of s, an average value corresponding to the $H^{th}$ denoising operation (namely, the target denoising operation) in the N denoising operations. A value of H is greater than or equal to 1, and the value of His 1 in step 1002.

Correspondingly, the execution device may generate, based on the second prediction information corresponding to the first noisy data, the value of n, and the value of s, a covariance corresponding to the $H^{th}$ denoising operation (namely, the target denoising operation) in the N denoising operations.

The second prediction information corresponding to the first noisy data indicates the square of the predicted noise between the first noisy data and the target clean data, or the second prediction information indicates the square of the predicted distance between the first prediction information and the target actual noise. For further understanding of this solution, two examples of a formula for generating the covariance corresponding to the target denoising operation based on the second prediction information corresponding to the first noisy data are disclosed below.

If the second prediction information indicates the square of the predicted noise between the first noisy data and the target clean data, an example of a calculation formula of the covariance corresponding to the target denoising operation is disclosed as follows:

$$\hat{\sigma}_n(x_n)^2 = \lambda_n^2 + \gamma_n^2 \frac{\bar{\beta}_n}{\bar{\alpha}_n}\left(h_n(x_n) - \hat{\epsilon}_n(x_n)^2\right) \tag{1}$$

$\hat{\sigma}_n(x_n)^2$ represents the covariance corresponding to the target denoising operation. $x_n$ represents noisy data input into the first neural network, and may specifically represent the first noisy data, or may represent second noisy data. $\bar{\beta}_n$ represents a variance of a total amount of noise added from a $0^{th}$ noise addition operation to an $n^{th}$ step of noise addition operation in a noise addition process, and $$\alpha_n = 1 - \bar{\beta}_n \cdot \lambda_n^2 = \eta^2 \frac{\bar{\beta}_s}{\bar{\beta}_n}\beta_{n|s},$$

$\eta$ is a hyperparameter, a value of n is between 0 and 1, n is usually 0 or 1, $\bar{\beta}_s$ represents a variance of a total amount of noise added from the $0^{th}$ noise addition operation to an $s^{th}$ step of noise addition operation in the noise addition process, and $\beta_{n|s}$ represents a variance of a total amount of noise added from the $s^{th}$ step of noise addition operation to the $n^{th}$ step of noise addition operation in the noise addition process.

$$\gamma_n = \sqrt{\bar{\alpha}_s} - \sqrt{\bar{\beta}_s - \lambda_n^2}\sqrt{\frac{\bar{\alpha}_n}{\bar{\beta}_n}},$$

and $\bar{\alpha}_s = 1 - \bar{\beta}_s$. $h_n(x_n)$ represents a square of predicted noise between the noisy data and the clean data (that is, a meaning of the second prediction information generated by the second feature processing network), and $\hat{\epsilon}_n(x_n)^2$ represents a square of the first prediction information (to be specific, the predicted noise between the noisy data and the clean data) generated by the first feature processing network. It should be understood that the example in the formula (1) is merely used to prove implementability of this solution, and is not intended to limit this solution.

If the second prediction information indicates the square of the predicted distance between the first prediction information and the target actual noise, another example of the calculation formula of the covariance corresponding to the target denoising operation is disclosed as follows:

$$\hat{\sigma}_n(x_n)^2 = \lambda_n^2 + \gamma_n^2 \frac{\bar{\beta}_n}{\bar{\alpha}_n}g_n(x_n) \tag{2}$$

$\hat{\sigma}_n(x_n)^2$ represents the covariance corresponding to the target denoising operation. For meanings of $x_n$, $\lambda_n^2$, $\gamma_n^2$, and $$\frac{\bar{\beta}_n}{\bar{\alpha}_n},$$

refer to the explanations of the parameters in the formula (1), and details are not described herein again. $g_n(x_n)$ represents the square of the predicted distance between the first prediction information and the target actual noise (that is, another meaning of the second prediction information generated by the second feature processing network). It should be understood that the example in the formula (2) is merely used to prove implementability of this solution, and is not intended to limit this solution.

Further, for a generation principle of the formula (1), in the ideal state, any step of denoising operation in the M steps of denoising operations can implement an inverse process of a corresponding noise addition operation, in other words, denoised data obtained by each denoising operation is completely consistent with noisy data at a corresponding location. Therefore, effect of each of the N denoising operations may be optimized based on a similarity between a first probability distribution and a second probability distribution. Any denoising operation (namely, the $H^{th}$ denoising operation) in the N denoising operations is used to obtain, based on noisy data corresponding to an $n^{th}$ step of noise addition operation, noisy data corresponding to an $s^{th}$ step of noise addition operation. The first probability distribution is a probability distribution of the noisy data obtained through the $n^{th}$ step of noise addition operation (namely, denoised data obtained through an $(M-n)^{th}$ step of denoising operation in the ideal state) and the noisy data obtained through the $s^{th}$ step of noise addition operation (namely, denoised data obtained through an $(M-s)^{th}$ step of denoising operation in the ideal state), and the second probability distribution is a probability distribution of denoised data obtained by performing an $(H-1)^{th}$ denoising operation by using the first neural network and the second neural network and denoised data obtained by performing the $H^{th}$ denoising operation by using the first neural network and the second neural network. A higher similarity between the first probability distribution and the second probability distribution indicates better effect of the $H^{th}$ denoising operation performed by using the first neural network and the second neural network.

In this case, optimizing the similarity between the first probability distribution and the second probability distribution is equivalent to optimizing the effect of the $H^{th}$ denoising operation. Therefore, a first formula used to express an objective of minimizing the similarity between the first probability distribution and the second probability distribution is obtained. Because performing each denoising operation by using the first neural network and the second neural network includes: generating, based on the first prediction information generated by the first neural network, the average value corresponding to the $H^{th}$ denoising operation; and generating, based on the second prediction information generated by the second neural network, the covariance corresponding to the $H^{th}$ denoising operation, a function term representing the covariance corresponding to the $H^{th}$ denoising operation exists in the first formula. After the first formula is obtained, the first formula is transformed based on a moment matching principle, to obtain a second formula. Further, the second formula is transformed based on a covariance decomposition formula (covariance decomposition formula), to obtain a final optimal covariance expression.

For further understanding of this solution, an example in which the similarity between the first probability distribution and the second probability distribution is specifically a KL divergence between the first probability distribution and the second probability distribution, and an optimal covariance is expressed by using the square of the predicted noise between the noisy data and the target clean data is used herein. In this case, an example of the optimal covariance expression may be as follows:

$$\sigma_n^*(x_n)^2 = \lambda_n^2 + \gamma_n^2 \frac{\bar{\beta}_n}{\bar{\alpha}_n}\left(E_{q(x_0|x_n)}[\epsilon_n^2] - E_{q(x_0|x_n)}[\epsilon_n]^2\right) \tag{3}$$

$\sigma_n^*(x_n)^2$ represents the covariance corresponding to the target denoising operation. For meanings of $\lambda_n^2$, $\gamma_n^2$, and $$\frac{\bar{\beta}_n}{\bar{\alpha}_n},$$

refer to the explanations of the parameters in the formula (1), and details are not described herein again. $E_g(x_0|x_n)[\epsilon_n^2]$ indicates that it is expected that most accurate ER can be predicted by using $x_n$, $\epsilon_n^2$ represents a square of actual noise between $x_n$ (that is, the noisy data processed in the $H^{th}$ denoising operation) and the clean data, and when $h_n(x_n)$ (that is, an output of the second feature processing network) is an optimal result, $h_n(x_n)$ and $E_{q(x_0|x_n)}[\epsilon_n^2]$ are equivalent. $E_{q(x_0|x_n)}[\epsilon_n]^2$ represents a square of $E_{q(x_0|x_n)}[\epsilon_n]$, $E_{q(x_0|x_n)}[\epsilon_n]$ indicates that it is expected that most accurate $\epsilon_n$ can be predicted by using $x_n$, $\epsilon_n$ represents the actual noise between $x_n$ and the clean data, and when $\hat{\epsilon}_n(x_n)$ (that is, an output of the first feature processing network) is an optimal result, $\hat{\epsilon}_n(x_n)$ and $E_{q(x_0|x_n)}[\epsilon_n]$ are equivalent. Therefore, the formula (1) can be obtained based on continued derivation of the formula (3).

For further understanding of this solution, an example in which the similarity between the first probability distribution and the second probability distribution is specifically a KL divergence between the first probability distribution and the second probability distribution, and an optimal covariance is expressed by using the square of the predicted distance between the first prediction information and the target actual noise is used herein. In this case, an example of the optimal covariance expression may be as follows:

$$\sigma_n^*(x_n)^2 = \lambda_n^2 + \gamma_n^2 \frac{\bar{\beta}_n}{\bar{\alpha}_n}E_{q(x_0|x_n)}\left[(\epsilon_n - \hat{\epsilon}_n(x_n))^2\right] \tag{4}$$

$\sigma_n^*(x_n)^2$ represents the covariance corresponding to the target denoising operation. For meanings of $\lambda_n^2$, $\gamma_n^2$, and $$\frac{\bar{\beta}_n}{\bar{\alpha}_n},$$

refer to the explanations of the parameters in the formula (1), and details are not described herein again. $E_{q(x_0|x_n)}[(\epsilon_n - \hat{\epsilon}_n(x_n)^2]$ indicates that it is expected that most accurate $(\epsilon_n - \hat{\epsilon}_n(x_n))^2$ can be predicted by using $x_n$, $(\epsilon_n - \hat{\epsilon}_n(x_n))^2$ represents a square of a residual between actual noise between $x_n$ and the clean data and first prediction information that is output by the first feature extraction network and that corresponds to $x_n$, and when $g_n(x_n)$ (that is, a result output by the second feature processing network) is optimal, $g_n(x_n)$ and $E_{q(x_0|x_n)}[(\epsilon_n - \hat{\epsilon}_n(x_n))^2]$ are equivalent. Therefore, the formula (2) can be obtained through continued derivation of the formula (4). It should be understood that the examples of the formula (3) and the formula (4) herein are merely used to prove feasibility of the formula (1) and the formula (2), and are not intended to limit this solution.

In this embodiment of this application, implementation details of generating distribution information of each denoising operation based on first prediction information and second prediction information are further disclosed, and implementability of this solution is improved.

1004: The execution device performs sampling in distribution space to which the distribution information corresponding to the target denoising operation points, to obtain denoised data corresponding to the first noisy data.

In this embodiment of this application, after obtaining the distribution information corresponding to the target denoising operation, the execution device may randomly sample one piece of data from the distribution space to which the distribution information points, to obtain one piece of denoised data corresponding to the first noisy data. In other words, one of the N denoising operations is completed, and denoised data obtained through the one of the N denoising operations is obtained.

Figure 11:
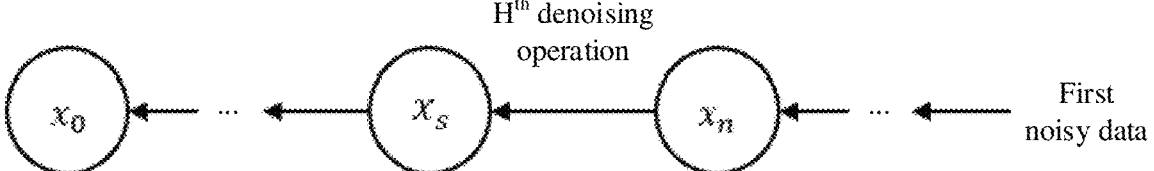
FIG. 11 is a diagram of performing a denoising operation in a data denoising method according to an embodiment of this application.

For more intuitive understanding of this solution, refer to FIG. 11. FIG. 11 is a diagram of performing a denoising operation in the data denoising method according to an embodiment of this application. As shown in FIG. 11, after performing the N denoising operations on the first noisy data, the training device can obtain the target clean data corresponding to the first noisy data. In the ideal state, the $H^{th}$ denoising operation in the N denoising operations is to obtain, based on the noisy data (that is, $x_n$ in FIG. 11) corresponding to the $n^{th}$ step of noise addition operation, the noisy data (that is, $x_s$ in FIG. 11) corresponding to the $s^{th}$ step of noise addition operation. It should be understood that the example in FIG. 11 is merely for ease of understanding this solution, and is not intended to limit this solution.

1005: The execution device determines whether a quantity of denoising operations performed on the first noisy data reaches N, and if the quantity does not reach N, performs step 1006; or if the quantity reaches N, outputs the target clean data that is obtained through an $N^{th}$ denoising operation and that corresponds to the first noisy data.

In this embodiment of this application, after performing a denoising operation on the first noisy data, the execution device may determine whether a total quantity of denoising operations performed on the first noisy data reaches N. If the quantity does not reach N, step 1006 is performed. If the quantity reaches N, the target clean data that is obtained through the $N^{th}$ denoising operation and that corresponds to the first noisy data is output. N is an integer greater than or equal to 1, and N is a hyperparameter. Correspondingly, on a premise that the value of M is fixed, n and s that correspond to each of the N denoising operations are also hyperparameters.

1006: The execution device generates, by using the first feature processing network, first prediction information corresponding to the second noisy data, where the first prediction information corresponding to the second noisy data indicates predicted noise between the second noisy data and the target clean data.

1007: The execution device generates, by using the second feature processing network, second prediction information corresponding to the second noisy data, where the second prediction information corresponding to the second noisy data indicates a square of the predicted noise between the second noisy data and the target clean data, or the second prediction information indicates a square of a predicted distance between the first prediction information and target actual noise.

1008: The execution device generates, based on the first prediction information and the second prediction information that correspond to the second noisy data, distribution information corresponding to a target denoising operation.

1009: The execution device performs sampling in distribution space to which the distribution information corresponding to the target denoising operation points, to obtain denoised data corresponding to the second noisy data.

In this embodiment of this application, steps 1005 to 1009 are all optional steps. If the value of N is 1, after step 1004 is performed, the denoised data generated in step 1004 may be determined as the clean data corresponding to the first noisy data. If the value of N is an integer greater than or equal to 2, steps 1005 to 1009 are performed, and after step 1009 is performed, step 1005 is performed again. For specific implementations of steps 1005 to 1009, refer to the descriptions of the specific implementations of steps 1001 to 1004. A difference lies in that initial noisy data (namely, the first noisy data) in steps 1001 to 1004 is replaced with noisy data obtained through at least one denoising operation in steps 1005 to 1009.

Figure 12:
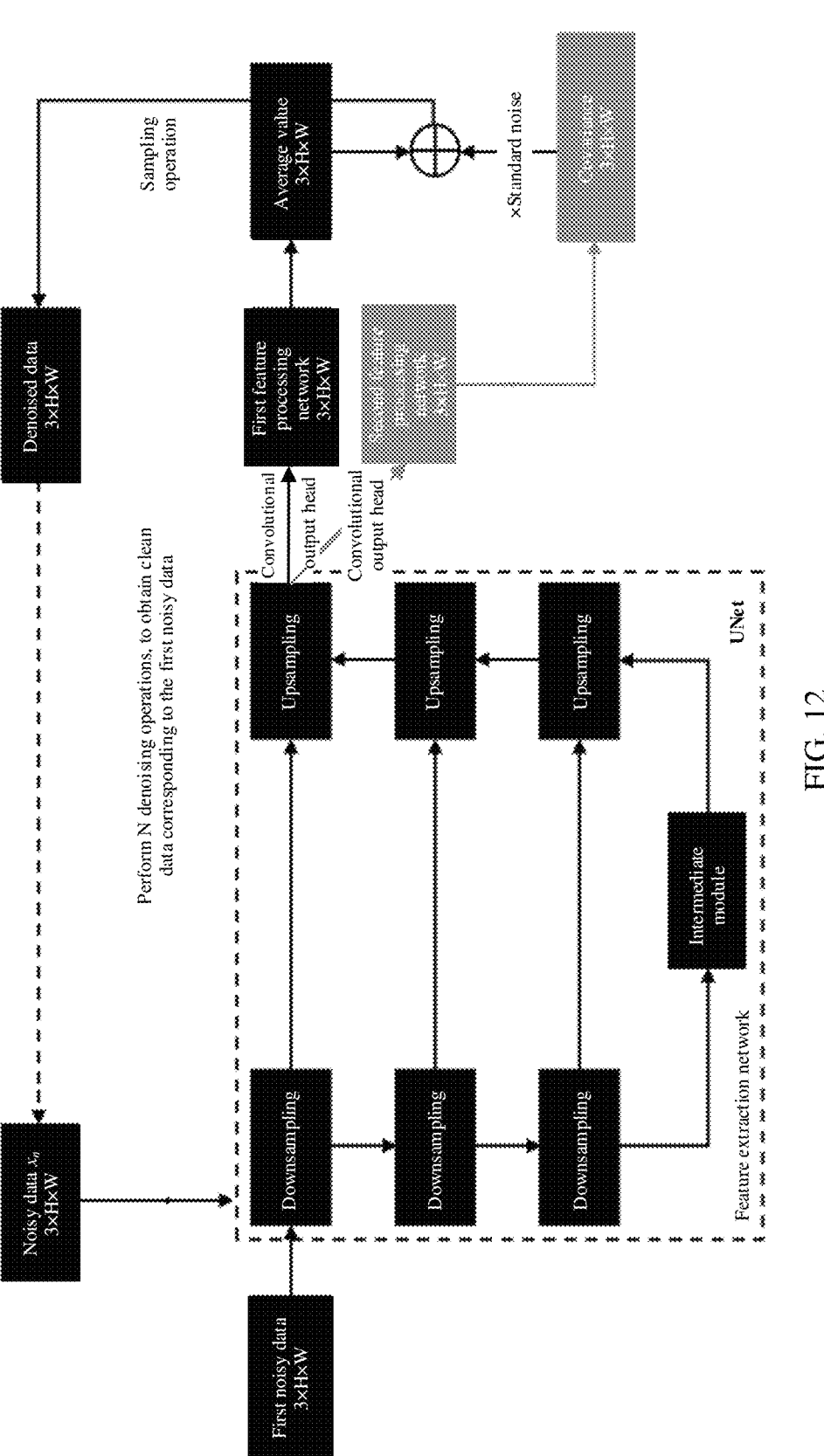
FIG. 12 is a schematic flowchart of a data denoising method according to an embodiment of this application.

For more intuitive understanding of this solution, refer to FIG. 12. FIG. 12 is a schematic flowchart of the data denoising method according to an embodiment of this application. As shown in FIG. 12, after obtaining the first noisy data, the execution device needs to perform the N denoising operations on the first noisy data. In a $1^{st}$ denoising operation, the execution device inputs the first noisy data into the feature extraction network, to obtain feature information generated by the feature extraction network.

The execution device processes the feature information by using the first feature processing network, to obtain first prediction information generated by the first feature processing network; and generates, based on the first prediction information, an average value corresponding to the current denoising operation. The execution device processes the feature information by using the second feature processing network, to obtain second prediction information generated by the second feature processing network; and generates, based on the second prediction information, a covariance corresponding to the current denoising operation.

The execution device determines, based on the average value and the covariance that correspond to the current denoising operation, distribution space corresponding to the current denoising operation; and performs a sampling operation in the distribution space, to obtain denoised data corresponding to the $1^{st}$ denoising operation, in other words, obtain noisy data $x_n$ used in a $2^{nd}$ denoising operation.

In the $2^{nd}$ denoising operation, the execution device inputs the noisy data $x_n$ into the feature extraction network, to obtain feature information generated by the feature extraction network. Further, the $2^{nd}$ denoising operation is performed based on the feature information, to obtain denoised data corresponding to the $2^{nd}$ denoising operation, in other words, obtain noisy data used in a $3^{rd}$ denoising operation.

The execution device repeatedly performs the denoising operation for N times, so that the clean data corresponding to the first noisy data can be obtained. It should be understood that the example in FIG. 12 is merely for ease of understanding this solution, and is not intended to limit this solution.

In this embodiment of this application, in a process of performing a denoising operation, the first feature processing network is used to generate first prediction information, to be specific, predicted noise between noisy data and the clean data; the second feature processing network is used to generate second prediction information, where the second prediction information indicates a square of the predicted noise between the noisy data and the clean data or indicates a square of a distance between the first prediction information and actual noise; and further distribution information corresponding to the denoising operation is generated based on the first prediction information and the second prediction information, and sampling is performed in distribution space to which the distribution information points to obtain denoised data corresponding to the noisy data. In this way, one denoising operation in the M steps of denoising operations is completed. Because the first feature processing network and the second feature processing network learn of data between the noisy data and the clean data, in other words, neither the first feature processing network nor the second feature processing network directly learns of the distribution information corresponding to the denoising operation, a quantity of denoising operations performed on the first noisy data is not constrained by the training phase. When the quantity of denoising operations needs to be adjusted, the first feature processing network and the second feature processing network do not need to be retrained. According to the denoising solution provided in this embodiment of this application, computer resource overheads caused by repeated training of a neural network are avoided, and flexibility of the inference phase is improved.

The following further presents beneficial effect brought by this embodiment of this application with reference to experimental data. Compared with performing a denoising operation on data by using an original diffusion probabilistic model, performing a denoising operation on the data according to the method provided in this embodiment of this application can greatly improve a speed of an inference process and reduce computational resource consumption in an inference phase while ensuring quality of clean data. FIG. 13 is a diagram of comparison between clean data generated by using the diffusion probabilistic model and clean data generated according to the method provided in this embodiment of this application according to an embodiment of this application. Upper sub-diagrams of FIG. 13 show an experiment performed on a dataset CIFAR10, and lower sub-diagrams of FIG. 13 show an experiment performed on a dataset ImageNet. It can be learned through comparison that quality of the clean data obtained according to the method provided in this embodiment of this application is not poor.

When a denoising operation is performed on data in the CIFAR10 to obtain clean data, compared with a case in which the original diffusion probabilistic model is used, an inference speed of a neural network provided in this embodiment of this application is improved by 59 times, and computational resource overheads are only 1.7% of original overheads.

When a denoising operation is performed on data in the ImageNet to obtain clean data, compared with a case in which the original diffusion probabilistic model is used, an inference speed of a neural network provided in this embodiment of this application is improved by 80 times, and computational resource overheads are only 1.3% of original overheads.

Figure 14:
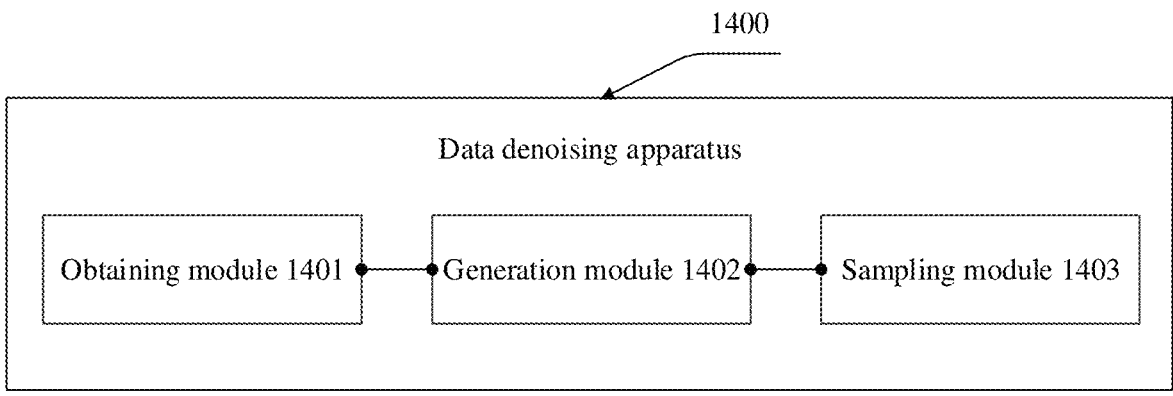
FIG. 14 is a diagram of a structure of a data denoising apparatus according to an embodiment of this application.

Based on the embodiments corresponding to FIG. 1a to FIG. 13, to better implement the foregoing solutions in embodiments of this application, the following further provides related devices configured to implement the foregoing solutions. Specifically, refer to FIG. 14. FIG. 14 is a diagram of a structure of a data denoising apparatus according to an embodiment of this application. The data denoising apparatus 1400 is configured to perform at least one denoising operation on first noisy data, to obtain clean data corresponding to the first noisy data. The denoising apparatus 1400 includes: an obtaining module 1401, configured to obtain first prediction information, where the first prediction information indicates predicted noise between second noisy data and the clean data, the first prediction information is generated by a first feature processing network, and the second noisy data is the first noisy data, or the second noisy data is noisy data obtained by performing at least one denoising operation on the first noisy data, where the obtaining module 1401 is further configured to obtain second prediction information, where the second prediction information indicates a square of the predicted noise between the second noisy data and the clean data, or the second prediction information indicates a square of a predicted distance between the first prediction information and actual noise, the actual noise includes actual noise between the second noisy data and the clean data, the second prediction information is generated by a second feature processing network, and both feature information processed by the first feature processing network and feature information processed by the second feature processing network are obtained based on the second noisy data; a generation module 1402, configured to generate, based on the first prediction information and the second prediction information, distribution information corresponding to a target denoising operation, where the target denoising operation is any one of the at least one denoising operation; and a sampling module 1403, configured to perform sampling in distribution space to which the distribution information points, to obtain denoised data corresponding to the second noisy data.

In a possible design, the first feature processing network and the second feature processing network are used to process same feature information.

In a possible design, the at least one denoising operation is N denoising operations if the first noisy data is pure noise, N is an integer greater than or equal to 11, N is a hyperparameter, the feature information processed by the first feature processing network includes feature information of the second noisy data and feature information of constraint information, and the clean data meets a constraint of the constraint information.

In a possible design, the generation module 1402 includes: a first generation submodule, configured to generate, based on the first prediction information, an average value corresponding to the target denoising operation; and a second generation submodule, configured to generate, based on the second prediction information, a covariance corresponding to the target denoising operation.

In a possible design, the distribution space to which the distribution information points follows a Gaussian distribution or a Gamma distribution.

It should be noted that content such as information exchange and an execution process between the modules/ units in the data denoising apparatus 1400 is based on a same concept as the method embodiment corresponding to FIG. 10A to FIG. 12 in this application. For specific content, refer to the descriptions in the method embodiment in this application. Details are not described herein again.

Figure 15:
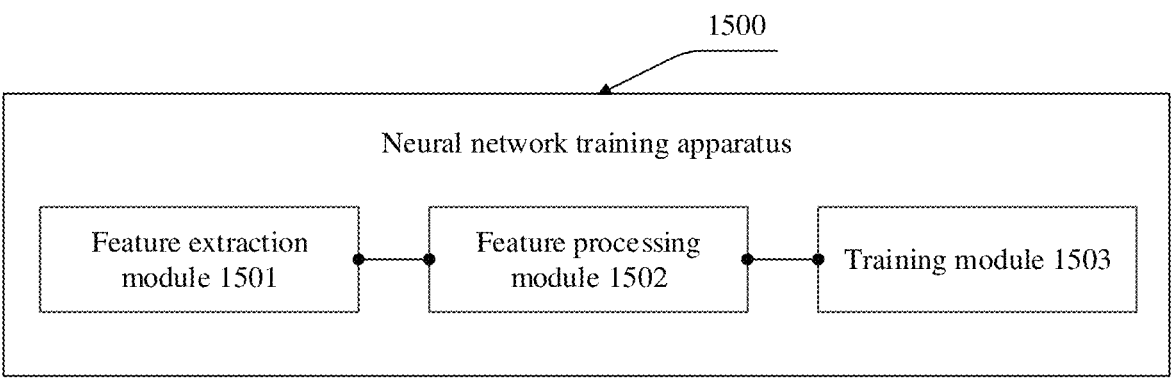
FIG. 15 is a diagram of a structure of a neural network training apparatus according to an embodiment of this application.

FIG. 15 is a diagram of a structure of a neural network training apparatus according to an embodiment of this application. The neural network training apparatus 1500 includes: a feature extraction module 1501, configured to input third noisy data into a feature extraction network, to obtain first feature information generated by the feature extraction network, where the first feature information includes at least feature information of the third noisy data; a feature processing module 1502, configured to process the first feature information by using a second feature process- ing network, to obtain second prediction information output by the second feature processing network, where the second prediction information indicates a square of predicted noise between the third noisy data and first clean data, and the third noisy data is obtained by performing a plurality of noise addition operations on the first clean data; and a training module 1503, configured to train the second feature processing network based on first expectation information corresponding to the third noisy data, the second prediction information, and a first loss function until a convergence condition is met, where the first loss function indicates a similarity between the second prediction information and the first expectation information, and the first expectation infor- mation indicates a square of actual noise between the third noisy data and the first clean data.

In a possible design, the training module 1503 is specifi- cally configured to: keep a parameter of the feature extrac- tion network unchanged, and update a parameter of the second feature processing network, where the feature extrac- tion network is from a trained first neural network, the first neural network is used to generate, based on input fourth noisy data, predicted noise between the fourth noisy data and second clean data, and the second clean data is obtained by performing a plurality of noise addition operations on the fourth noisy data.

In a possible design, the neural network training apparatus 1500 is further configured to obtain the trained first neural network, the first neural network is used to generate first prediction information based on input pure noise and con- straint information, and the first prediction information indicates predicted noise between the pure noise and clean data that meets the constraint information.

It should be noted that content such as information exchange and an execution process between the modules/ units in the neural network training apparatus 1500 is based on a same concept as the method embodiment corresponding to FIG. 3 to FIG. 6 in this application. For specific content, refer to the descriptions in the method embodiment in this application. Details are not described herein again.

Figure 16:
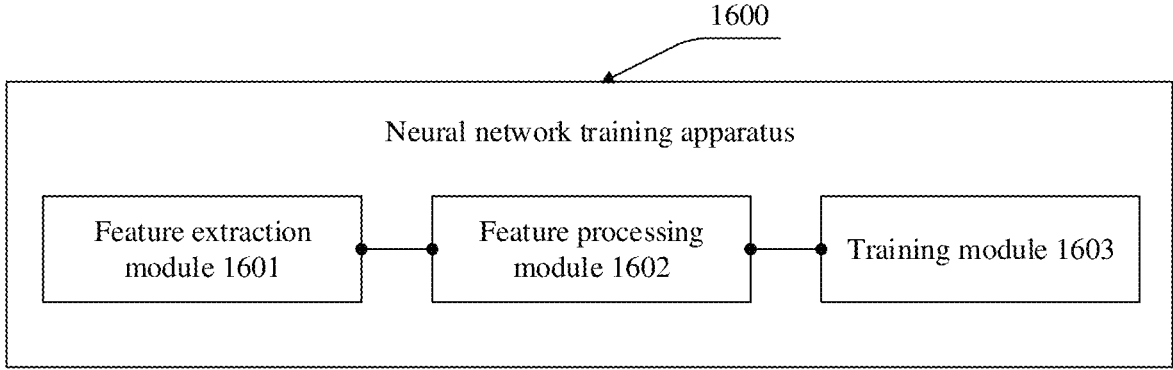
FIG. 16 is a diagram of a structure of a neural network training apparatus according to an embodiment of this application.

FIG. 16 is a diagram of a structure of a neural network training apparatus according to an embodiment of this application. The neural network training apparatus 1600 includes: a feature extraction module 1601, configured to input third noisy data into a feature extraction network, to obtain first feature information generated by the feature extraction network, where the first feature information includes at least feature information of the third noisy data; a feature processing module 1602, configured to process the first feature information by using a second feature process- ing network, to obtain second prediction information output by the second feature processing network, where the third noisy data is obtained by performing a plurality of noise addition operations on first clean data, the second prediction information indicates a square of a predicted distance between first prediction information and actual noise, the first prediction information includes predicted noise that is generated by a first neural network and that is between the third noisy data and the first clean data, the first neural network is used to generate the first prediction information based on the input third noisy data, and the actual noise includes actual noise between the third noisy data and the first clean data; and a training module 1603, configured to train the second feature processing network based on second expecta- tion information corresponding to the third noisy data, the second prediction information, and a second loss function until a convergence condition is met, where the second loss function indicates a similarity between the second prediction information and the second expectation information, and the second expectation information indicates a square of an actual distance between the first prediction information and the actual noise.

In a possible design, the training module 1603 is specifi- cally configured to: keep a parameter of the feature extrac- tion network unchanged, and update a parameter of the second feature processing network, where the feature extrac- tion network is from a trained first neural network.

It should be noted that content such as information exchange and an execution process between the modules/ units in the neural network training apparatus 1600 is based on a same concept as the method embodiment corresponding to FIG. 7 to FIG. 9 in this application. For specific content, refer to the descriptions in the method embodiment in this application. Details are not described herein again.

Figure 17:
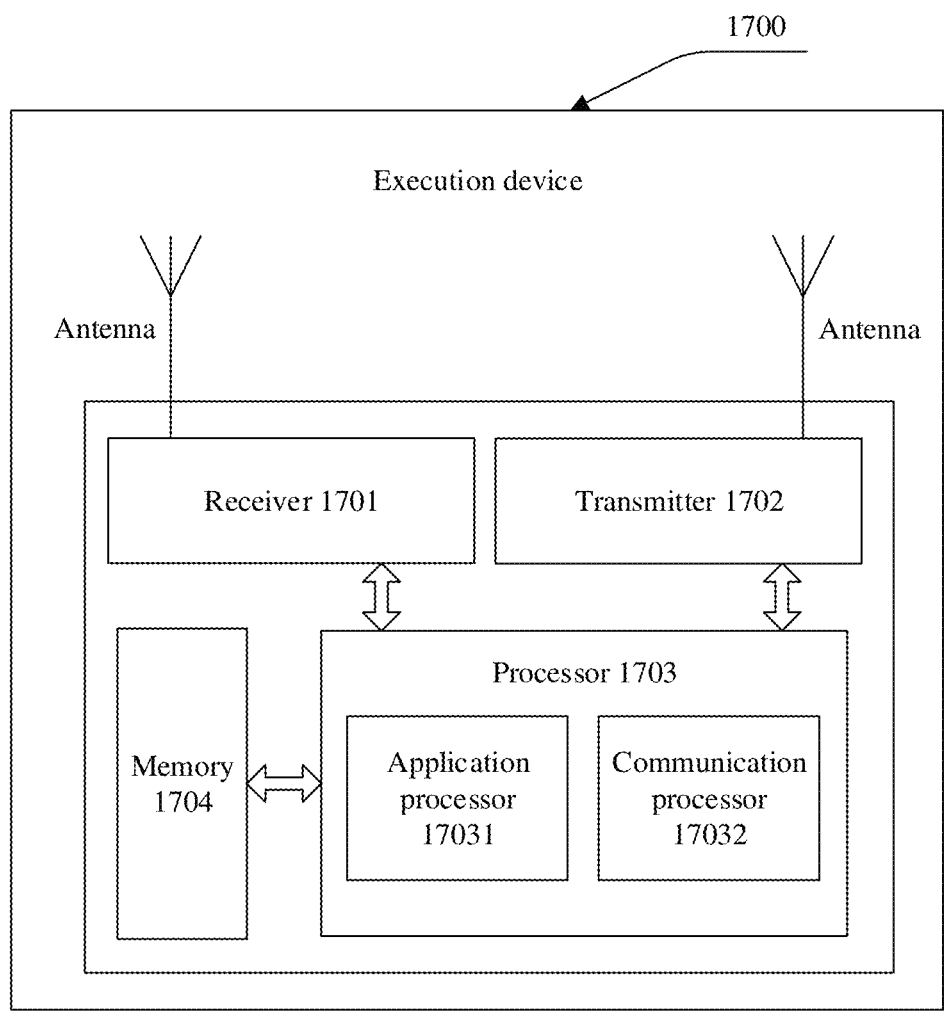
FIG. 17 is a diagram of a structure of an execution device according to an embodiment of this application.

The following describes an execution device provided in an embodiment of this application. FIG. 17 is a diagram of a structure of the execution device according to this embodi- ment of this application. Specifically, the execution device 1700 includes a receiver 1701, a transmitter 1702, a pro- cessor 1703, and a memory 1704 (where there may be one or more processors 1703 in the execution device 1700, and one processor is used as an example in FIG. 17). The processor 1703 may include an application processor 17031 and a communication processor 17032. In some embodi- ments of this application, the receiver 1701, the transmitter 1702, the processor 1703, and the memory 1704 may be connected through a bus or in another manner.

The memory 1704 may include a read-only memory and a random access memory, and provide instructions and data for the processor 1703. A part of the memory 1704 may further include a non-volatile random access memory (NVRAM). The memory 1704 stores a processor and opera- tion instructions, an executable module, a data structure, a subset thereof, or an extension set thereof. The operation instructions may include various operation instructions for implementing various operations.

The processor 1703 controls operations of the execution device. During specific application, the components of the execution device are coupled together through a bus system. In addition to a data bus, the bus system may further include a power bus, a control bus, a status signal bus, and the like. However, for clear description, various types of buses in the figure are referred to as the bus system.

The methods disclosed in embodiments of this application may be applied to the processor 1703 or may be imple- mented by the processor 1703. The processor 1703 may be an integrated circuit chip and has a signal processing capa- bility. In an implementation process, steps of the foregoing method may be completed by using an integrated logic circuit of hardware in the processor 1703 or instructions in a form of software. The processor 1703 may be a general- purpose processor, a digital signal processor (DSP), a micro- processor, or a microcontroller; or may further include an application-specific integrated circuit (ASIC), a field pro- grammable gate array (FPGA) or another programmable logic device, a discrete gate or transistor logic device, or a discrete hardware component. The processor 1703 may implement or perform the methods, steps, and logical block diagrams that are disclosed in embodiments of this application. The general-purpose processor may be a microprocessor, or the processor may be any conventional processor or the like. The steps of the method disclosed with reference to embodiments of this application may be directly performed and completed by a hardware decoding processor, or may be performed and completed by using a combination of hardware in the decoding processor and a software module. The software module may be located in a mature storage medium in the art, for example, a random access memory, a flash memory, a read-only memory, a programmable read-only memory, an electrically erasable programmable memory, or a register. The storage medium is located in the memory 1704, and the processor 1703 reads information in the memory 1704 and completes the steps of the method in combination with hardware of the processor.

The receiver 1701 may be configured to: receive input digital or character information, and generate a signal input related to related setting and function control of the execution device. The transmitter 1702 may be configured to output digital or character information through a first interface. The transmitter 1702 may be further configured to send instructions to a disk group through the first interface, to modify data in the disk group. The transmitter 1702 may further include a display device, for example, a display screen.

In this embodiment of this application, the application processor 17031 in the processor 1703 is configured to perform the data denoising method performed by the execution device in the embodiment corresponding to FIG. 10A to FIG. 12. It should be noted that a specific manner in which the application processor 17031 performs the foregoing steps is based on a same concept as the method embodiment corresponding to FIG. 10A to FIG. 12 in this application, and technical effect brought in this embodiment of this application is the same as that in the method embodiment corresponding to FIG. 10A to FIG. 12 in this application. For specific content, refer to the descriptions in the method embodiment in this application. Details are not described herein.

Figure 18:
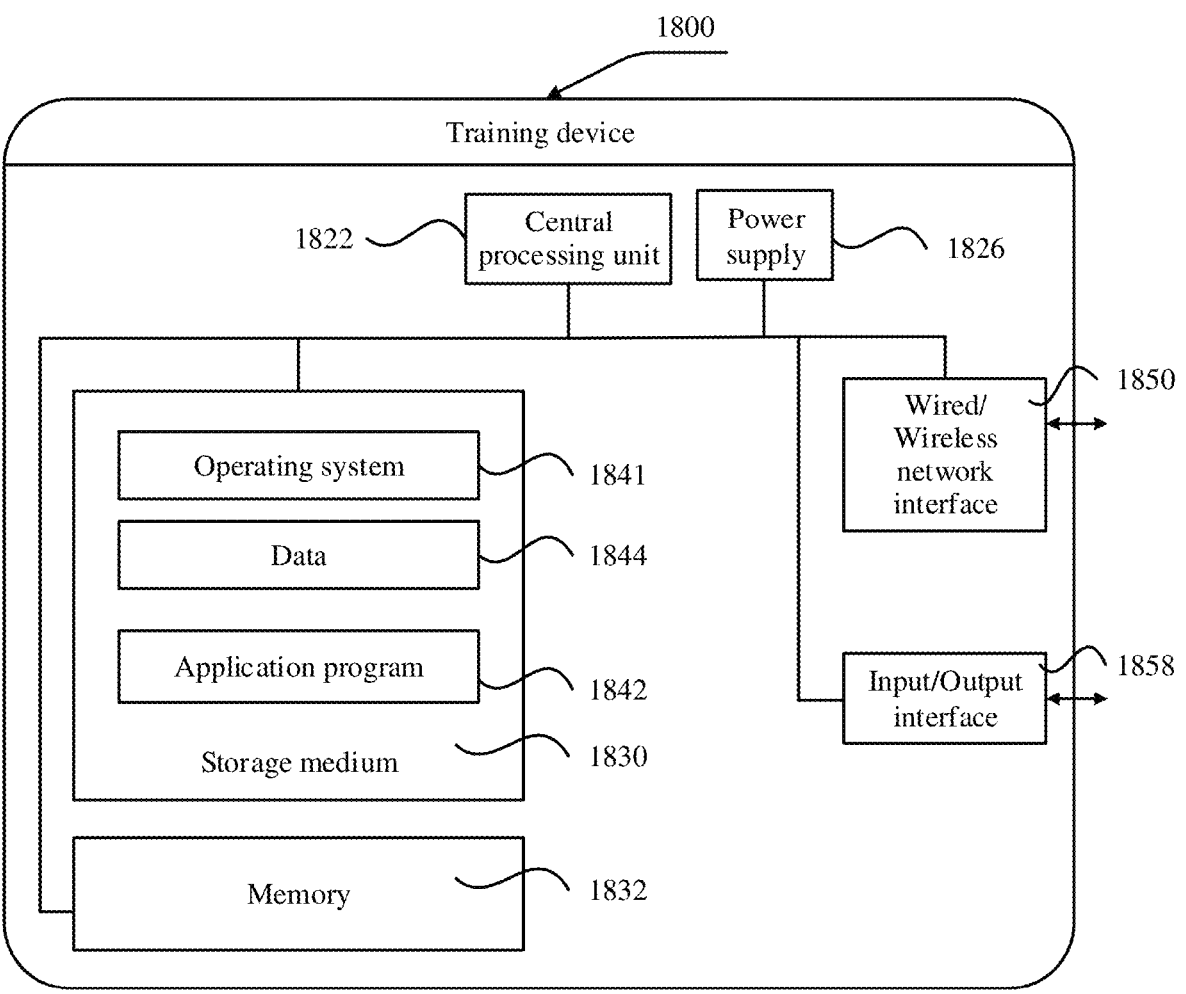
FIG. 18 is a diagram of a structure of a training device according to an embodiment of this application.

An embodiment of this application further provides a training device. FIG. 18 is a diagram of a structure of the training device according to this embodiment of this application. Specifically, the training device 1800 is implemented by one or more servers, the training device 1800 may vary greatly with configurations or performance, and may include one or more central processing units (CPUs) 1822 (for example, one or more processors), a memory 1832, and one or more storage media 1830 (for example, one or more mass storage devices) that store an application 1842 or data 1844. The memory 1832 and the storage medium 1830 may perform temporary storage or permanent storage. The program stored in the storage medium 1830 may include one or more modules (not shown in the figure). Each module may include a series of instruction operations for the training device. Further, the central processing unit 1822 may be configured to communicate with the storage medium 1830, to perform, on the training device 1800, a series of instruction operations in the storage medium 1830.

The training device 1800 may further include one or more power supplies 1826, one or more wired or wireless network interfaces 1850, one or more input/output interfaces 1858, and/or one or more operating systems 1841, for example, Windows Server™, Mac OS X™, Unix™, Linux™, and FreeBSD™.

In this embodiment of this application, in a case, the central processing unit 1822 is configured to perform the data denoising method performed by the training device in the embodiment corresponding to FIG. 3 to FIG. 6. It should be noted that a specific manner in which the central processing unit 1822 performs the foregoing steps is based on a same concept as the method embodiment corresponding to FIG. 3 to FIG. 6 in this application, and technical effect brought in this embodiment of this application is the same as that in the method embodiment corresponding to FIG. 3 to FIG. 6 in this application. For specific content, refer to the descriptions in the method embodiment in this application. Details are not described herein.

In a case, the central processing unit 1822 is configured to perform the data denoising method performed by the training device in the embodiment corresponding to FIG. 7 to FIG. 9. It should be noted that a specific manner in which the central processing unit 1822 performs the foregoing steps is based on a same concept as the method embodiment corresponding to FIG. 7 to FIG. 9 in this application, and technical effect brought in this embodiment of this application is the same as that in the method embodiment corresponding to FIG. 7 to FIG. 9 in this application. For specific content, refer to the descriptions in the method embodiment in this application. Details are not described herein.

An embodiment of this application further provides a computer program product. The computer program product includes a program. When the program is run on a computer, the computer is enabled to perform the steps performed by the execution device in the method described in the embodiment shown in FIG. 10A to FIG. 12, or the computer is enabled to perform the steps performed by the training device in the method described in the embodiment shown in FIG. 3 to FIG. 6, or the computer is enabled to perform the steps performed by the training device in the method described in the embodiment shown in FIG. 7 to FIG. 9.

An embodiment of this application further provides a computer-readable storage medium. The computer-readable storage medium stores a program. When the program is run on a computer, the computer is enabled to perform the steps performed by the execution device in the method described in the embodiment shown in FIG. 10A to FIG. 12, or the computer is enabled to perform the steps performed by the training device in the method described in the embodiment shown in FIG. 3 to FIG. 6, or the computer is enabled to perform the steps performed by the training device in the method described in the embodiment shown in FIG. 7 to FIG. 9.

The execution device, the training device, the data denoising apparatus, or the neural network training apparatus provided in embodiments of this application may be specifically a chip. The chip includes a processing unit and a communication unit. The processing unit may be, for example, a processor. The communication unit may be, for example, an input/output interface, a pin, or a circuit. The processing unit may execute computer-executable instructions stored in a storage unit, to enable the chip to perform the data denoising method described in the embodiment shown in FIG. 10A to FIG. 12, or to enable the chip in the training device to perform the neural network training method described in the embodiment shown in FIG. 3 to FIG. 6, or enable the chip in the training device to perform the neural network training method described in the embodiment shown in FIG. 7 to FIG. 9. Optionally, the storage unit is a storage unit in the chip, for example, a register or a cache; or the storage unit may be a storage unit that is in the radio access device end and that is located outside the chip, for example, a read-only memory (ROM), another type of static storage device that can store static information and instructions, or a random access memory (RAM).

Figure 19:
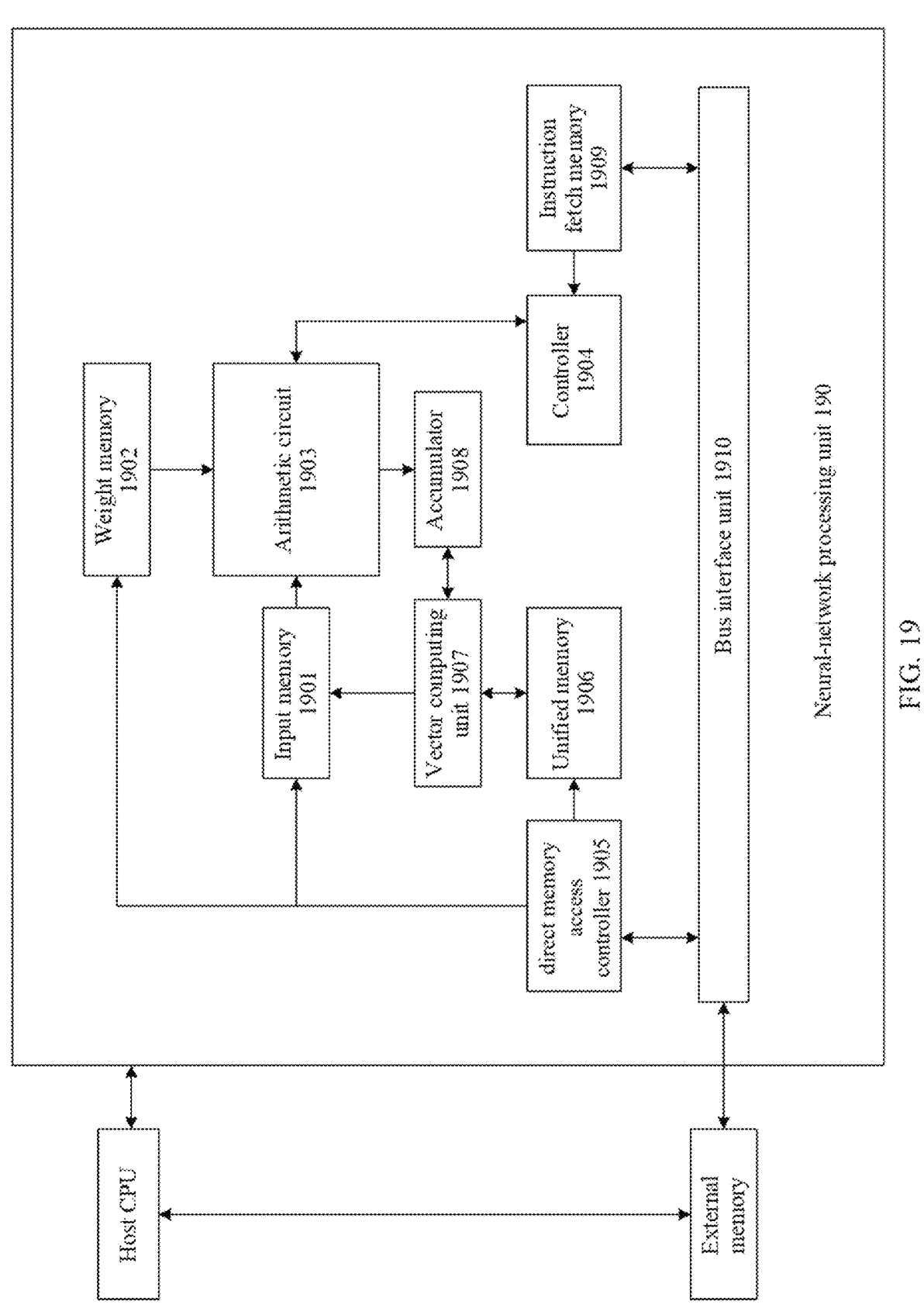
FIG. 19 is a diagram of a structure of a chip according to an embodiment of this application.

Specifically, FIG. 19 is a diagram of a structure of a chip according to an embodiment of this application. The chip may be represented as a neural-network processing unit NPU 190. The NPU 190 is mounted to a host CPU (Host CPU) as a coprocessor, and the host CPU allocates a task to the NPU. A core part of the NPU 190 is an arithmetic circuit 1903. A controller 1904 controls the arithmetic circuit 1903 to extract matrix data in a memory and perform a multiplication operation.

In some implementations, the arithmetic circuit 1903 internally includes a plurality of processing units (PEs). In some implementations, the arithmetic circuit 1903 is a two-dimensional systolic array. The arithmetic circuit 1903 may alternatively be a one-dimensional systolic array or another electronic circuit capable of performing mathematical operations such as multiplication and addition. In some implementations, the arithmetic circuit 1903 is a general-purpose matrix processor.

For example, it is assumed that there is an input matrix A, a weight matrix B, and an output matrix C. The arithmetic circuit fetches data corresponding to the matrix B from a weight memory 1902, and buffers the data on each PE in the arithmetic circuit. The arithmetic circuit fetches data of the matrix A from an input memory 1901, performs a matrix operation on the data and the matrix B, and stores an obtained partial result or final result of the matrix in an accumulator (accumulator) 1908.

A unified memory 1906 is configured to store input data and output data. Weight data is directly transferred to the weight memory 1902 through a direct memory access controller (DMAC) 1905. Input data is also transferred to the unified memory 1906 through the DMAC.

A BIU (Bus Interface Unit), that is, a bus interface unit 1910, is configured for interaction between an AXI bus and the DMAC and interaction between the AXI bus and an instruction fetch memory (IFB) 1909.

The bus interface unit 1910 (Bus Interface Unit, BIU for short) is used by the instruction fetch memory 1909 to obtain an instruction from an external memory, and further used by the direct memory access controller 1905 to obtain original data of the input matrix A or the weight matrix B from the external memory.

The DMAC is mainly configured to transfer input data in the external memory DDR to the unified memory 1906, transfer the weight data to the weight memory 1902, or transfer input data to the input memory 1901.

A vector computing unit 1907 includes a plurality of arithmetic processing units. When necessary, the vector computing unit 1907 performs further processing on an output of the arithmetic circuit, for example, performs vector multiplication, vector addition, an exponential operation, a logarithmic operation, and value comparison. The vector computing unit 1907 is mainly used for non-convolutional/ fully connected layer network computation in a neural network, such as batch normalization (batch normalization), pixel-level summation, and upsampling a feature map.

In some implementations, the vector computing unit 1907 can store a processed output vector in the unified memory 1906. For example, the vector computing unit 1907 may apply a linear function and/or a non-linear function to the output of the arithmetic circuit 1903, for example, perform linear interpolation on a feature map extracted by a convolutional layer, or for another example, accumulate value vectors to generate an activation value. In some implementations, the vector computing unit 1907 generates a normalized value, a pixel-level summation value, or both. In some implementations, the processed output vector can be used as an activation input to the arithmetic circuit 1903, for example, for use at a subsequent layer in the neural network.

The instruction fetch memory (instruction fetch buffer) 1909 connected to the controller 1904 is configured to store instructions used by the controller 1904.

The unified memory 1906, the input memory 1901, the weight memory 1902, and the instruction fetch memory 1909 are all on-chip memories. The external memory is private to a hardware architecture of the NPU.

Operations at each layer of the neural network in the foregoing method embodiments may be performed by the arithmetic circuit 1903 or the vector computing unit 1907.

The processor mentioned anywhere above may be a general-purpose central processing unit, a microprocessor, an ASIC, or one or more integrated circuits that are configured to control program execution of the method according to the first aspect.

In addition, it should be noted that the described apparatus embodiments are merely examples. The units described as separate parts may or may not be physically separate, and parts displayed as units may or may not be physical units, that is, may be located at one position, or may be distributed on a plurality of network units. Some or all of the modules may be selected based on actual requirements to achieve the objectives of the solutions of embodiments. In addition, in the accompanying drawings of the apparatus embodiments provided in this application, connection relationships between modules indicate that the modules have communication connections with each other, which may be specifically implemented as one or more communication buses or signal cables.

Based on the descriptions of the foregoing implementations, a person skilled in the art may clearly understand that this application may be implemented by using software in addition to necessary universal hardware, or certainly by using dedicated hardware, including an application-specific integrated circuit, a dedicated CPU, a dedicated memory, a dedicated component, and the like. Generally, all functions completed by a computer program can be easily implemented by using corresponding hardware, and a specific hardware structure used to implement a same function may be in various forms, for example, in a form of an analog circuit, a digital circuit, or a dedicated circuit. However, in this application, a software program implementation is a better implementation in most cases. Based on such an understanding, the technical solutions of this application essentially or the part contributing to the conventional technology may be implemented in a form of a software product. The computer software product is stored in a readable storage medium, for example, a floppy disk, a USB flash drive, a removable hard disk, a ROM, a RAM, a magnetic disk, or an optical disc of a computer, and includes several instructions for instructing a computer device (which may be a personal computer, a training device, a network device, or the like) to perform the methods in embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedure or functions according to embodiments of this application are completely or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a training device or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A data denoising method, wherein the method is used to perform at least one denoising operation on first noisy data to obtain clean data corresponding to the first noisy data, and a target denoising operation in the at least one denoising operation comprises:

obtaining first prediction information, wherein the first prediction information indicates predicted noise between second noisy data and the clean data, which indicates a predicted amount of noise that is added from the clean data and is carried in the second noisy data, the first prediction information is generated by a first feature processing network, and the second noisy data is one of the first noisy data, or noisy data obtained by performing at least one denoising operation on the first noisy data;

obtaining second prediction information, wherein the second prediction information indicates one of a square of the predicted noise between the second noisy data and the clean data, or a square of a predicted distance between the first prediction information and actual noise, the actual noise comprises actual noise between the second noisy data and the clean data, which indicates an actual amount of noise that is added from the clean data and is carried in the second noisy data, the second prediction information is generated by a second feature processing network, and both feature information processed by the first feature processing network and feature information processed by the second feature processing network are obtained based on the second noisy data;

generating, based on the first prediction information and the second prediction information, distribution information corresponding to the target denoising operation; and performing sampling in a distribution space to which the distribution information points, to obtain denoised data corresponding to the second noisy data;

wherein the second feature processing network is trained by performing the following operations:

inputting third noisy data into a feature extraction network, to obtain first feature information generated by the feature extraction network;

processing the first feature information by using the second feature processing network, to obtain second prediction information output by the second feature processing network, wherein the second prediction information indicates a square of predicted noise between the third noisy data and first clean data, which indicates a predicted amount of noise that is added from the first clean data and is carried in the third noisy data, and the third noisy data is obtained by performing a plurality of noise addition operations on the first clean data;

training the second feature processing network based on first expectation information corresponding to the third noisy data, the second prediction information, and a first loss function until a convergence condition is met; and wherein the first, second and third noise data are data with noise, and the clean data is data without noise.

2. The method according to claim 1, wherein the first feature processing network and the second feature processing network are used to process same feature information.

3. The method according to claim 1, wherein the at least one denoising operation is N denoising operations, N is an integer greater than or equal to 1, N is a hyperparameter based on the first noisy data being pure noise, the feature information processed by the first feature processing network comprises feature information of the second noisy data and feature information of constraint information, and the clean data meets a constraint of the constraint information.

4. The method according to claim 1, wherein the generating, based on the first prediction information and the second prediction information, distribution information corresponding to the target denoising operation comprises:

generating, based on the first prediction information, an average value corresponding to the target denoising operation; and generating, based on the second prediction information, a covariance corresponding to the target denoising operation.

5. The method according to claim 1, wherein the distribution space to which the distribution information points follows one of a Gaussian distribution or a Gamma distribution.

6. The method according to claim 1, wherein the second feature processing network is trained by performing the following operations:

wherein the first feature information comprises at least feature information of the third noisy data;

wherein the first loss function indicates a similarity between the second prediction information and the first expectation information, and the first expectation information indicates a square of actual noise between the third noisy data and the first clean data, which indicates an actual amount of noise that is added from the clean data and is carried in the third noisy data.

7. The method according to claim 6, wherein the training the second feature processing network comprises:

keeping a parameter of the feature extraction network unchanged, and updating a parameter of the second feature processing network, wherein the feature extraction network is from a trained first neural network, the first neural network is used to generate, based on input fourth noisy data, predicted noise between the fourth noisy data and second clean data, which indicates a predicted amount of noise that is added from the clean data and is carried in the fourth noisy data, and the second clean data is obtained by performing a plurality of noise addition operations on the fourth noisy data.

8. The method according to claim 6, wherein the method is further used to obtain the trained first neural network, the first neural network is used to generate the first prediction information based on input pure noise and constraint information, and the first prediction information indicates predicted noise between the pure noise and clean data, which indicates a predicted amount of noise that is added from the clean data and is carried in the pure noise, that meets the constraint information.

9. The method according to claim 1, wherein the second feature processing network is trained by performing the following operations:

inputting third noisy data into a feature extraction network, to obtain first feature information generated by the feature extraction network, wherein the first feature information comprises at least feature information of the third noisy data;

processing the first feature information by using the second feature processing network, to obtain second prediction information output by the second feature processing network, wherein the third noisy data is obtained by performing a plurality of noise addition operations on first clean data, the second prediction information indicates a square of a predicted distance between the first prediction information and actual noise, the first prediction information comprises predicted noise that is generated by a first neural network and that is between the third noisy data and the first clean data, the first neural network is used to generate the first prediction information based on the input third noisy data, and the actual noise comprises actual noise between the third noisy data and the first clean data, which indicates a predicted amount of noise that is added from the first clean data and is carried in the third noisy data; and training the second feature processing network based on second expectation information corresponding to the third noisy data, the second prediction information, and a second loss function until a convergence condition is met, wherein the second loss function indicates a similarity between the second prediction information and the second expectation information, and the second expectation information indicates a square of an actual distance between the first prediction information and the actual noise.

10. The method according to claim 9, wherein the training the second feature processing network comprises:

keeping a parameter of the feature extraction network unchanged, and updating a parameter of the second feature processing network, wherein the feature extraction network is from a trained first neural network.

11. An execution device, comprising a processor and a memory, wherein the processor is coupled to the memory;

the memory is configured to store a program, wherein the program, when executed by the processor, instructs the processor to perform the following operations:

obtaining first prediction information, wherein the first prediction information indicates predicted noise between second noisy data and the clean data, which indicates a predicted amount of noise that is added from the clean data and is carried in the second noisy data, the first prediction information is generated by a first feature processing network, and the second noisy data is one of the first noisy data, or noisy data obtained by performing at least one denoising operation on the first noisy data;

obtaining second prediction information, wherein the second prediction information indicates one of a square of the predicted noise between the second noisy data and the clean data, or a square of a predicted distance between the first prediction information and actual noise, the actual noise comprises actual noise between the second noisy data and the clean data, which indicates an actual amount of noise that is added from the clean data and is carried in the second noisy data, the second prediction information is generated by a second feature processing network, and both feature information processed by the first feature processing network and feature information processed by the second feature processing network are obtained based on the second noisy data;

generating, based on the first prediction information and the second prediction information, distribution information corresponding to the target denoising operation; and performing sampling in distribution space to which the distribution information points, to obtain denoised data corresponding to the second noisy data;

wherein the second feature processing network is trained by performing the following operations:

inputting third noisy data into a feature extraction network, to obtain first feature information generated by the feature extraction network;

processing the first feature information by using the second feature processing network, to obtain second prediction information output by the second feature processing network, wherein the second prediction information indicates a square of predicted noise between the third noisy data and first clean data, which indicates a predicted amount of noise that is added from the first clean data and is carried in the third noisy data, and the third noisy data is obtained by performing a plurality of noise addition operations on the first clean data;

training the second feature processing network based on first expectation information corresponding to the third noisy data, the second prediction information, and a first loss function until a convergence condition is met; and wherein the first, second and third noise data are data with noise, and the clean data is data without noise.

12. The device according to claim 11, wherein the first feature processing network and the second feature processing network are used to process same feature information.

13. The device according to claim 11, wherein the at least one denoising operation is N denoising operations, N is an integer greater than or equal to 1, N is a hyperparameter based on the first noisy data being pure noise, the feature information processed by the first feature processing network comprises feature information of the second noisy data and feature information of constraint information, and the clean data meets a constraint of the constraint information.

14. The device according to claim 11, wherein the generating, based on the first prediction information and the second prediction information, distribution information corresponding to the target denoising operation comprises:

generating, based on the first prediction information, an average value corresponding to the target denoising operation; and generating, based on the second prediction information, a covariance corresponding to the target denoising operation.

15. The device according to claim 11, wherein the distribution space to which the distribution information points follows one of a Gaussian distribution or a Gamma distribution.

16. The device according to claim 11, wherein the second feature processing network is trained by performing the following operations:

wherein the first feature information comprises at least feature information of the third noisy data;

wherein the first loss function indicates a similarity between the second prediction information and the first expectation information, and the first expectation information indicates a square of actual noise between the third noisy data and the first clean data, which indicates an actual amount of noise that is added from the first clean data and is carried in the third noisy data.

17. The device according to claim 11, wherein the second feature processing network is trained by performing the following operations:

inputting third noisy data into a feature extraction network, to obtain first feature information generated by the feature extraction network, wherein the first feature information comprises at least feature information of the third noisy data;

processing the first feature information by using the second feature processing network, to obtain second prediction information output by the second feature processing network, wherein the third noisy data is obtained by performing a plurality of noise addition operations on first clean data, the second prediction information indicates a square of a predicted distance between the first prediction information and actual noise, the first prediction information comprises predicted noise that is generated by a first neural network and that is between the third noisy data and the first clean data, which indicates a predicted amount of noise that is added from the first clean data and is carried in the third noisy data, the first neural network is used to generate the first prediction information based on the input third noisy data, and the actual noise comprises actual noise between the third noisy data and the first clean data, which indicates an actual amount of noise that is added from the clean data and is carried in the third noisy data; and training the second feature processing network based on second expectation information corresponding to the third noisy data, the second prediction information, and a second loss function until a convergence condition is met, wherein the second loss function indicates a similarity between the second prediction information and the second expectation information, and the second expectation information indicates a square of an actual distance between the first prediction information and the actual noise.

18. A non-transitory computer readable medium, comprising a program; and the program, when run on a computer, instructs the computer to perform following operations:

obtaining first prediction information, wherein the first prediction information indicates predicted noise between second noisy data and the clean data, which indicates a predicted amount of noise that is added from the clean data and is carried in the second noisy data, the first prediction information is generated by a first feature processing network, and the second noisy data is the first noisy data, or the second noisy data is noisy data obtained by performing at least one denoising operation on the first noisy data;

obtaining second prediction information, wherein the second prediction information indicates a square of the predicted noise between the second noisy data and the clean data, or the second prediction information indicates a square of a predicted distance between the first prediction information and actual noise, the actual noise comprises actual noise between the second noisy data and the clean data, which indicates an actual amount of noise that is added from the clean data and is carried in the second noisy data, the second prediction information is generated by a second feature processing network, and both feature information processed by the first feature processing network and feature information processed by the second feature processing network are obtained based on the second noisy data;

generating, based on the first prediction information and the second prediction information, distribution information corresponding to the target denoising operation; and performing sampling in distribution space to which the distribution information points, to obtain denoised data corresponding to the second noisy data;

wherein the second feature processing network is trained by performing the following operations:

inputting third noisy data into a feature extraction network, to obtain first feature information generated by the feature extraction network;

processing the first feature information by using the second feature processing network, to obtain second prediction information output by the second feature processing network, wherein the second prediction information indicates a square of predicted noise between the third noisy data and first clean data, which indicates a predicted amount of noise that is added from the first clean data and is carried in the third noisy data, and the third noisy data is obtained by performing a plurality of noise addition operations on the first clean data;

training the second feature processing network based on first expectation information corresponding to the third noisy data, the second prediction information, and a first loss function until a convergence condition is met; and wherein the first, second and third noise data are data with noise, and the clean data is data without noise.

19. The non-transitory computer readable medium according to claim 18, wherein the first feature processing network and the second feature processing network are used to process same feature information.

20. The non-transitory computer readable medium according to claim 18, wherein the at least one denoising operation is N denoising operations, N is an integer greater than or equal to 1, N is a hyperparameter based on the first noisy data being pure noise, the feature information processed by the first feature processing network comprises feature information of the second noisy data and feature information of constraint information, and the clean data meets a constraint of the constraint information.

* * * * *